US008145999B1

(12) United States Patent
Barrus et al.

(10) Patent No.: US 8,145,999 B1
(45) Date of Patent: Mar. 27, 2012

(54) SYSTEM AND METHOD FOR AUDIO CREATION AND EDITING IN A MULTIMEDIA MESSAGING ENVIRONMENT

(75) Inventors: John W. Barrus, Menlo Park, CA (US); Kim McCall, Menlo Park, CA (US); Audrey Tsang, San Francisco, CA (US); Gregory J. Wolff, Redwood City, CA (US); Marko Balabanovic, London (GB)

(73) Assignee: Ricoh Co., Ltd., Tokyo (JP)

( * ) Notice: Subject to any disclaimer, the term of this patent is extended or adjusted under 35 U.S.C. 154(b) by 1372 days.

(21) Appl. No.: 11/580,251

(22) Filed: Oct. 11, 2006

Related U.S. Application Data

(60) Division of application No. 10/043,443, filed on Jan. 9, 2002, now Pat. No. 7,225,405, which is a continuation-in-part of application No. 09/407,010, filed on Sep. 28, 1999, now Pat. No. 6,624,826.

(51) Int. Cl.
*G06F 3/00* (2006.01)
(52) U.S. Cl. ........ 715/716; 715/727; 715/853; 715/854; 715/723; 715/765
(58) Field of Classification Search .......... 715/853–854, 715/727
See application file for complete search history.

(56) References Cited

U.S. PATENT DOCUMENTS

| 5,151,998 | A | * | 9/1992 | Capps ........................... 704/278 |
| 5,430,835 | A | * | 7/1995 | Williams et al. .............. 715/203 |
| 5,504,853 | A | * | 4/1996 | Schuur et al. ................. 715/853 |
| 5,781,188 | A | * | 7/1998 | Amiot et al. .................. 715/723 |
| 5,799,280 | A | * | 8/1998 | Degen et al. .................. 704/276 |
| 5,821,845 | A | * | 10/1998 | Ohashi ............................ 336/92 |
| 5,892,507 | A | * | 4/1999 | Moorby et al. ............... 715/205 |
| 5,977,972 | A | * | 11/1999 | Bates et al. ................... 715/786 |
| 6,081,266 | A | * | 6/2000 | Sciammarella ............... 715/727 |
| 6,654,761 | B2 | * | 11/2003 | Tenev et al. ......................... 1/1 |

FOREIGN PATENT DOCUMENTS

| JP | 03-015899 A | 1/1991 |
| JP | 07-191978 A | 7/1995 |
| JP | 10/078963 A | 3/1998 |

OTHER PUBLICATIONS

Harmony Central, New Sound Forge 4.5,1998 pp. 1-3.*
Sound Forge v 4.5 demo, press release Jul. 10, 1998 Sonic Foundry pp. 1-6.*
Winamp, Winamp—The Definitive Audio Player for Windows, Sep. 7, 1998 pp. 1-5.*

* cited by examiner

*Primary Examiner* — Ryan F Pitaro
(74) *Attorney, Agent, or Firm* — Patent Law Works LLP

(57) ABSTRACT

A system for editing audio objects in which a variety of audio objects are represented as images and laid out in a 2 dimensional visual environment. The system includes a display unit, a processing unit, a user interface unit, and a device for playing/receiving audio. The system has the capability to perform a variety of editing functions, such as the recording and playback of audio content, joining and splitting audio objects, and reordering audio objects. Additionally, the system includes functionality to automatically recording new content when sound is detected above a set threshold. Furthermore, the system includes functionality for linking portions of audio objects to media objects such as HTML documents and video.

44 Claims, 32 Drawing Sheets
(20 of 32 Drawing Sheet(s) Filed in Color)

US 8,145,999 B1

SYSTEM AND METHOD FOR AUDIO CREATION AND EDITING IN A MULTIMEDIA MESSAGING ENVIRONMENT

CROSS-REFERENCES TO RELATED APPLICATIONS

This application is a divisional of U.S. patent application Ser. No. 10/043,443 filed on Jan. 9, 2002 now U.S. Pat. No. 7,225,405, which is a continuation-in-part of U.S. patent application Ser. No. 09/407,010, entitled "Method and Apparatus for Generating Visual Representations for Audio Documents," filed on Sep. 28, 1999 now U.S. Pat. No. 6,624,826, which are incorporated herein by reference. The present invention also relates to U.S. patent application Ser. No. 09/587,591, entitled "Method and System for Electronic Message Composition with Relevant Documents" filed on May 31, 2000, which is incorporated herein by reference.

BACKGROUND OF THE INVENTION

1. Field of the Invention

The invention relates to the field of authoring electronic information. More specifically, this invention relates to a method and apparatus for creating, modifying, and deleting audio objects.

2. Description of Related Art

Communication with others is central to the functioning of modern business. Oral and written communications comprise the bulk of this interaction. There are costs and benefits to each. Oral communications enable a greater degree of expressiveness and clarity while written media allow for the easy and efficient exchange of large amounts of information.

These tradeoffs carry over into the electronic realm. Text and email communications, while easy to generate, and placing a low burden on electronic hardware, do not allow the rich, expressive communication that sometimes may be required. Conversely, most of the tools for creating messages with audio content are too complex, cumbersome, and time consuming for regular usage. These tools are inadequate because they focus exclusively on temporal arrangements wherein the audio information is arranged relative to its playback sequence. None of the prior art allows for segments of audio to be associated with an item or group of items through spatial proximity on a 2 dimensional layout. This severely limits the potential for flexible and intuitive editing of audio alone or when it is part of larger multimedia messages.

What is needed is a method for creating effective audio content that is simple, efficient and intuitive.

SUMMARY OF THE INVENTION

The present invention overcomes the deficiencies and limitations of the prior art by providing a system and method for creating and editing audio objects. The system for editing audio objects advantageously represents the audio elements as images in a two-dimensional visual environment. The system includes a display unit, a processing unit, a user interface unit, and a device for playing/receiving audio. The system of the present invention includes an application module, an element creation module, a playback module, and storage for audio elements and link objects. The system also includes modules for splitting, joining, reordering and linking audio elements. The system has the capability to perform a variety of editing functions, such as the recording and playback of audio content, joining and splitting audio objects, and reordering audio objects. Additionally, the system includes functionality to automatically record new content when sound is detected above a set threshold. Furthermore, the system includes functionality for linking portions of audio objects to media objects such as HTML documents and video.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is illustrated by way of example and not by way of limitation in the figures of the accompanying drawings in which like reference numerals refer to similar elements.

DETAILED DESCRIPTION OF THE INVENTION

Figure 1A:
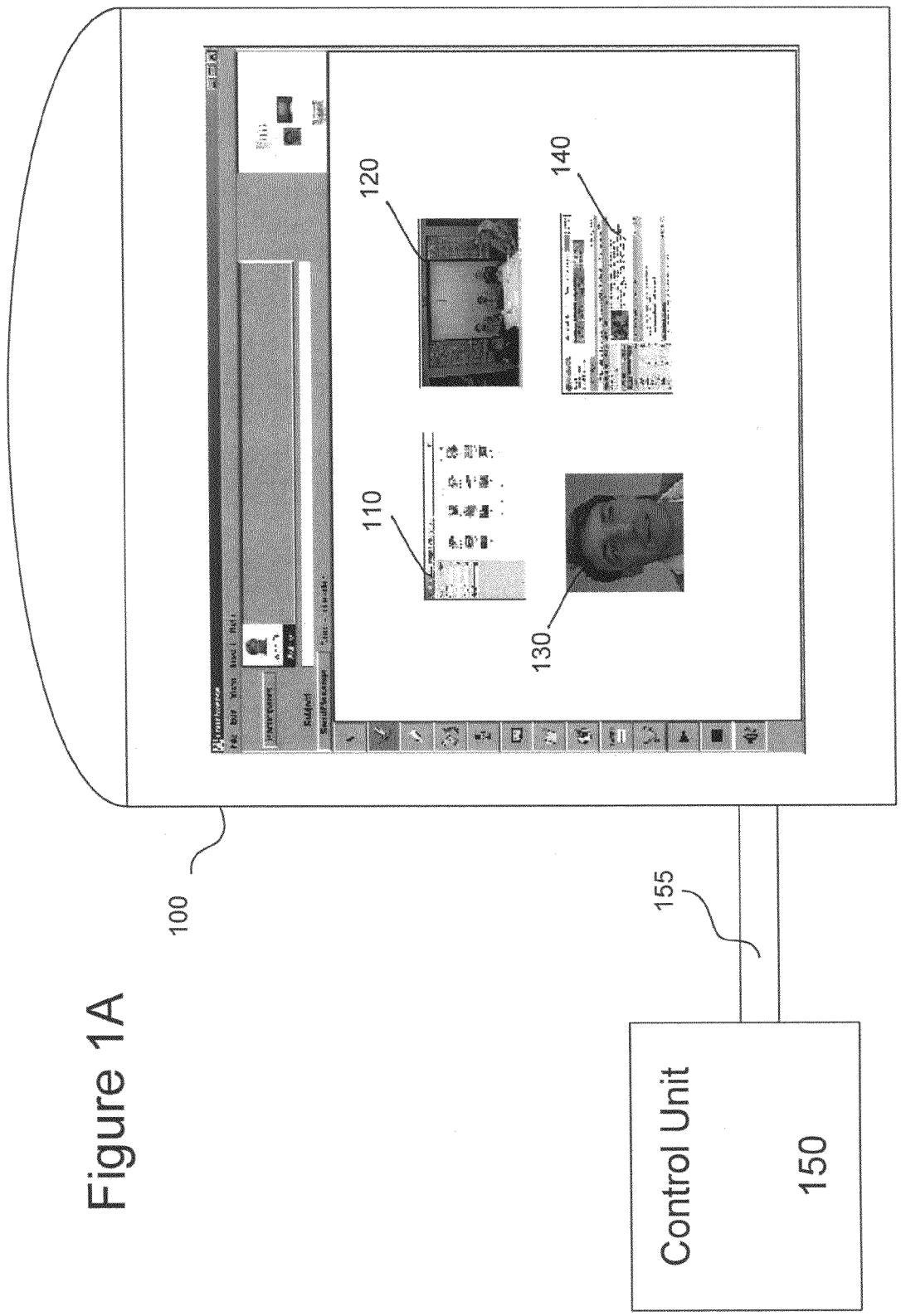
FIG. 1A illustrates an electronic display system upon which audio is edited.

A method and apparatus for editing audio objects is described below. In the following description, for purposes of explanation, numerous specific details are set forth in order to provide a thorough understanding of the invention. It will be apparent, however, to one skilled in the art, that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates an electronic display device 100 upon which various electronic documents 110, 120, 130 and 140 are displayed. Referring to FIG. 1A, display device 100 may comprise any device equipped to display electronic images and data as described herein. Display device 100 may be, for example, a cathode ray tube (CRT), liquid crystal display (LCD), or any other similarly equipped display device, screen, or monitor. In one embodiment, display device 100 is equipped with a touch screen in which a touch-sensitive, transparent panel covers the screen of display device 100. Additionally, display device 100 is shown coupled to control unit 150 by connector cable 155. Connector cable 155 may be external or internal to display device 100.

Control unit 150 may comprise an arithmetic logic unit, a microprocessor, a general-purpose computer, a personal digital assistant or some other information appliance equipped to provide electronic display signals to display device 100. In one embodiment, control unit 150 comprises a general-purpose computer having a graphical user interface, which may be generated by, for example, WINDOWS®, UNIX® or LINUX® based operating systems. In one embodiment, electronic documents 110, 120, 130, and 140 are generated by one or more application programs executed by control unit 150 including, without limitation, word processing applications, electronic mail applications, spreadsheet applications, and web browser applications. In one embodiment, the operating system and/or one or more application programs executed by control unit 150 provide "drag-and-drop" functionality where each electronic document, such as electronic documents 110, 120, 130, and 140, may be encapsulated as a separate data object.

Referring still to FIG. 1A, connector cable 155 represents any connector cable known in the art to route display signals from a device such as control unit 150 to a display device such as display device 100. In an alternative embodiment, control unit 150 may be situated within display device 100 or a wireless connection might be established and the use of connector cable 155 may not be required or may be internal to display device 100.

Figure 1B:
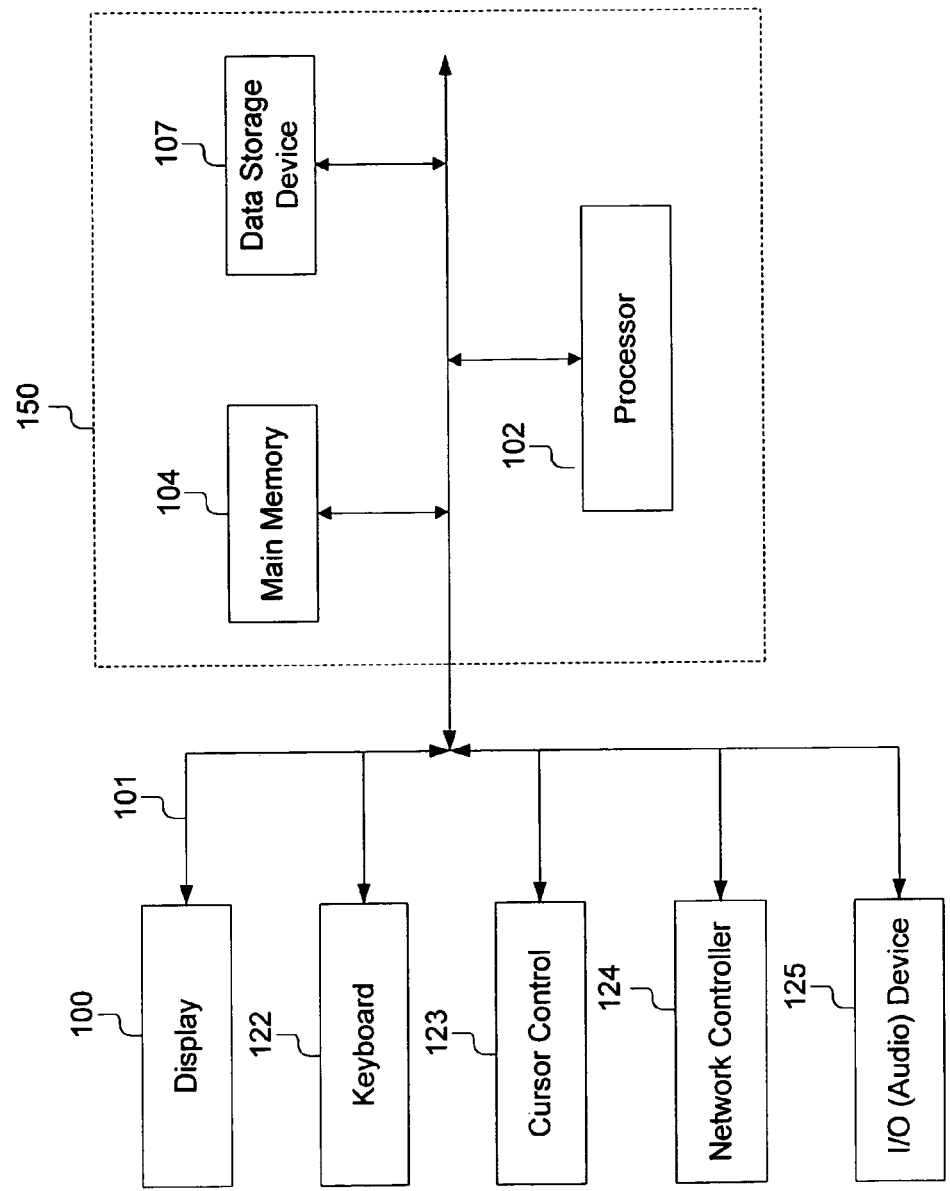
FIG. 1B illustrates a block diagram of the electronic display system of FIG. 1A.

Referring to FIG. 1B, control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1B, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 101 include display device 100, keyboard 122, cursor control device 123, network controller 124 and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a light pen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate. Furthermore those skilled in the art will recognize that the display device 100 and cursor control 123 may be combined such as in a touch screen.

An audio device 125 is coupled to system bus 101 and is equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose, audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or fewer components than those shown in FIG. 1B without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Audio Element Data Structures

Figure 2A:
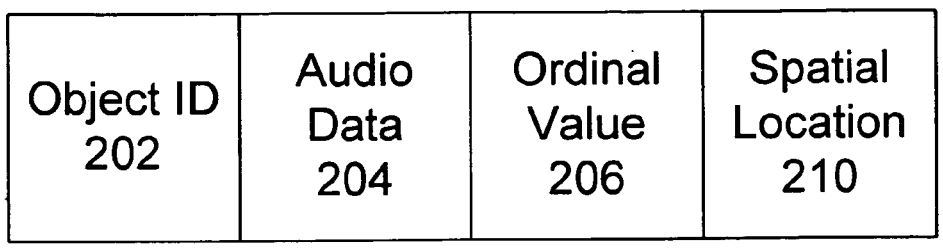
FIG. 2A illustrates a preferred embodiment of a memory structure of an audio element.

FIG. 2A illustrates one embodiment of a data structure for an audio element 200 according to the present invention. The system preferably includes many such audio elements. Each audio element 200 preferably comprises a plurality of fields including an object ID field 202, an audio data field 204, an ordinal value field 206, and a spatial location field 210. The object ID field 202 includes a unique identification number or name assigned by the system to designate and differentiate a particular audio object. The audio data field 204 is used to store the raw audio data or a pointer to a file storing the raw audio data. The audio data may be in any number of uncompressed or compressed formats such as MPEG Layer 3 (.mp3), way, or Real Audio (.ra). The ordinal value field 206 holds a unique integer value indicating the temporal position of the element relative to the other audio elements that are part of a message or conversation. In this application, the terms ordinal value and sequence number are used interchangeably to mean the same thing. The spatial location field 210 includes data to specify a location for display of an icon, symbol or other visual representation of the audio element 200 by the system of the present invention. For example, the spatial location field 210 can store the X and Y coordinates at which the audio element 200 should be displayed.

Figure 2B:
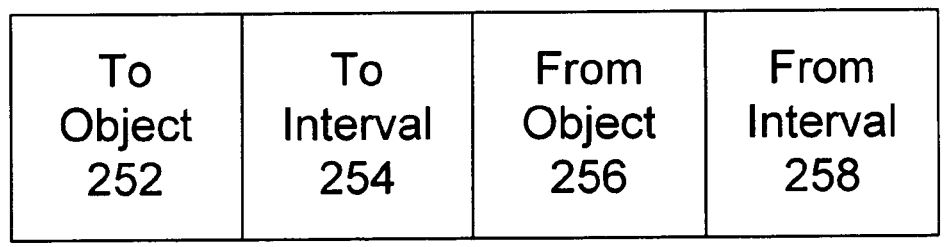
FIG. 2B illustrates a preferred embodiment of a linking object for the audio elements.

Referring now to FIG. 2B, a second data structure used by the present invention is shown. In order to link audio elements to each other and to other content or media objects; a link object 250 is used. Media objects in the present application refer to content that may be internal or external to the system of the present invention. For example, a media object may be an image, a video clip, a web page, a hypertext link, a text item, a document, a spreadsheet, or any other object (internal or external). Some of these are "external" while others (audio, sticky notes) may be created within the application or system of the present invention. The link object 250 preferably includes four fields 252, 254, 256, 258. The first field 252 is preferably used to store an identification number for an object at one end of the link referred to as the "to" object. The second field 254 is preferably used to store interval information such as the type and dimension of the media object referenced in the first field 252. This interval information preferably includes a spatial location, temporal range or character string depending on the type and dimension of the media object. The third field 256 is preferably used to store an identification number for an object at the other end of the link referred to as the "from" object. The fourth field 258 is preferably used to store interval information such as the type and dimension of the media object identified in the third field 256. Those skilled in the art will recognize that various alternate embodiments are possible such as using two fields, one for storing all the information for the "to" object and another for storing all the information for the "from" object.

In an alternate embodiment, the audio element 200 element may include another field for storing linking data instead of using the data structure just described. In such an alternate embodiment, a linking data field includes a temporal range within the audio data that is associated with certain content in a media object and an identifier of or pointer to the media object. Such media objects may be another audio element, a video clip, a web page, a hypertext link, a document or any other media object. Moreover, the linking data field could store a plurality of links to other objects.

Audio System

Figure 3:
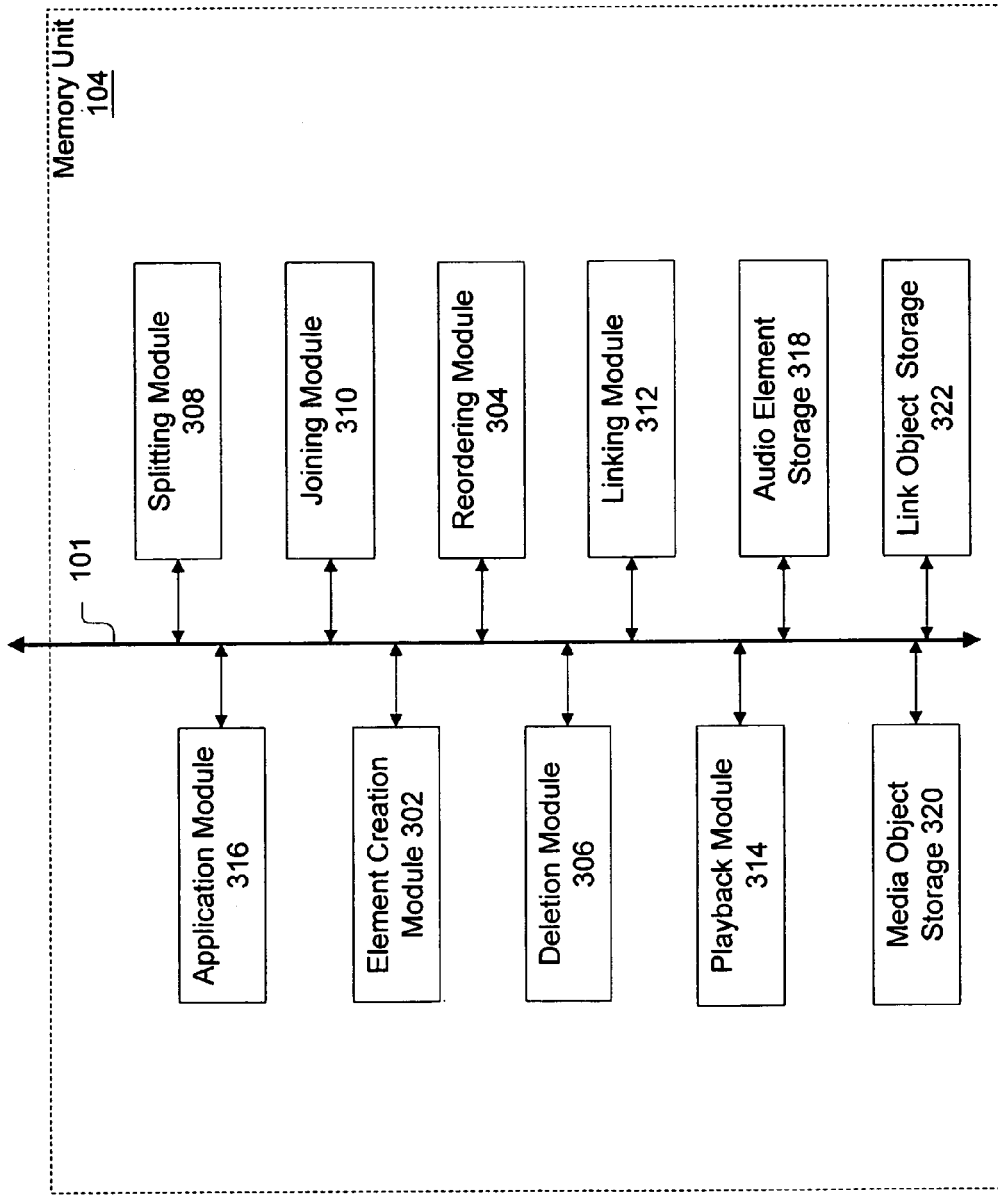
FIG. 3 illustrates a block diagram of an embodiment of a memory of the electronic display system.

FIG. 3 illustrates one embodiment of the memory 104 constructed according to the present invention. The collection of modules 302, 304, 306, 308, 310, 312, and 314 is coupled to a main application module 316 by the bus 101. The main application module 316 is also coupled to other components of the system 100 by the bus 101. The main application module 316 serves as the central interface between the other elements of the computer system 100 and the modules 302, 304, 306, 308, 310, 312 and 314. In one embodiment of the invention, the computer system 100 receives requests to perform an editing function through the keyboard 122, mouse 123, or some other type of input device. Methods of submitting this input are discussed in greater detail in the "editing interface" section below. The main application module 316 interprets the input and activates the appropriate module 302, 304, 306, 308, 310, 312, or 314. The application module 316 retrieves the relevant audio data from audio element storage 318 in the main memory 104 and passes it to the appropriate module 302, 304, 306, 308, 310, 312 or 314. The application module 316 also interacts with media object storage 320 or a link object storage as will be discussed below. The respective module 302, 304, 306, 308, 310, 312 or 314 modifies the data and returns it to the application module 316. The application module 316 sends the updated element information to the memory 104, or an output device as well as updating the display 100 to reflect the changes. A primary function of the application module 316 is to generate a user interface as will be described in more detail below with reference to FIGS. 4-16.

The playback module 314 is coupled to the main application module 316. The main application module 316, having received the appropriate input, sends a signal to initiate playback to the playback module 314. The playback module 314 processes the request and sends instructions to the application module 316, which in turn sends audio output to the user via the audio device 125. More specifically, the playback module 314 determines the audio element corresponding to the input from the user and retrieves that audio element from the audio element storage 318. Once the element has been retrieved, the playback module 314 extracts the raw audio data and outputs a stream of audio data based on input from the user. For example, the user may indicated a point at which playback is to begin. Based on such input from the user, the playback module 314 extracts a corresponding portion of the raw audio stored as part of the audio element and outputs it to the audio device 125. Additionally, the application module 316 sends a signal to the display 100 that updates the user interface to indicate which portions of the audio element are being played. This functionality will be described in more detail below with reference to FIGS. 6A-C and FIG. 10.

The element creation module 302 is coupled to the main application module 316 by the bus 101. Element creation is initiated when the application module 316 receives the appropriate input from the user, and it sends a signal to the element creation module 302, which generates a new audio element 200. The element creation module 302 creates a new audio element by generating a new audio element, assigning the element a unique identification number, assigning the audio element an ordinal value and storing them as part of the audio elements. Additionally, the application module 316 generates an image of the new audio element and sends a signal to the display 100 to update the user interface. The application module 316 receives a signal from the audio device (125) that it passes to the element creation module 302. As audio input is passed to the element creation module 302, it adds the audio input to the audio data field 204 of the audio element 200. When the application module 316 stops receiving an audio signal, it signals the element creation module 302 which in turn stops storing data in the audio data field 204 and completes the creation of the audio element. The application module 316 then stores the new audio element 200 in audio element storage 318 of the memory 104. The creation module 302 also sends a signal to the application module 316 to provide new ordinal values to existing audio elements if necessary.

A deletion module 306 is also coupled to the application module 316 by bus 101. The deletion module 306 is also coupled to the audio element storage 318. Deletion is initiated when the application module 316 receives the appropriate input from user. The application module 316 sends the signal to the deletion module 306 for processing. The deletion module 306 determines the audio element corresponding to the selection and deletes the audio element 200 from the audio element storage 318. The deletion module 306 also updates the fields of other audio elements to reflect the deletion such as modifying the ordinal number fields of other objects and the linking object storage 322. The deletion module 304 notifies the application module 316 once an audio element 200 has been deleted so that the application module 316 can update the display to reflect the deletion as well as any changes in ordinal numbers or links.

A joining module 310 is coupled to the application module 316 and the audio element storage 318 by bus 101. Joining is initiated when the application module 316 receives the appropriate input from the user. The application module 316 identifies an order (first audio element and second audio element) based on user input and retrieves the designated elements 200 from the audio element storage 318 of memory 104 and passes them to the joining module 310. The joining module 310 identifies the first of the audio elements to be joined as the first element based on the order specified by the user. Next, the joining module 310 retrieves the raw audio data from the second audio element and appends it to the existing data in the audio data field 204 of the first element. The joining module 310 then compares the ordinal value of the first element to the ordinal value of the second element and assigns the lower ordinal value to the ordinal value field 206 for the first element. The ordinal values of other elements are also modified to reflect the joining of the first element and the second element as is described below. The first audio element is then stored in the audio data storage 318. The second audio element is deleted from the audio data storage 318 by the joining module 310. This can either be done directly or by being coupled to the deletion module 306 and providing the request to the deletion module for servicing. The joining module 310 also determines if there are any link objects associated with the second element, and modifies them so they are associated with the corresponding audio interval that was added to the first element. The joining module 310 then passes the first element 200 to the application module 316. Additionally, the joining module 310 passes instructions to the application module 316 to update the display.

A splitting module 308 is coupled to the application module 316 and the audio element storage 318 by bus 101. Splitting is initiated when the application module 316 receives the appropriate input from the user. The application module 316 retrieves a designated audio element 200 from the audio element storage 318 of the memory 104 and passes the element 200 and a split point to the splitting module 308. The splitting module 308 reads the audio data field 204 of the element to be split. The splitting module 308 generates a new element and embeds in the audio data field 204 of the new element the audio data after the split point. The splitting module 308 also generates an ordinal value and a unique identification number for the newly created audio element. The splitting module 308 also determines if there are any link objects associated with an interval or portion of the audio of the designated audio element after the split point, and modifies such determined link objects so they are associated with the new audio element. The revised link objects, if any, are stored in the link object storage 322. The splitting module 308 then passes the new audio element to the application module 316. Additionally, the splitting module 308 passes instructions to the application module 316 to store the new element in memory 104, update the ordinal values or sequence numbers of the audio elements greater than the split element, and update the display.

A linking module 312 is coupled to the application module 316, the link object storage 322 and the audio element storage 318 by bus 101. Linking is initiated when the application module 316 receives the appropriate input from the user. The application module 316 retrieves a selected element from audio element storage 318 of the memory 104 and passes it, a designated temporal range and a media object ID to the linking module 312. The linking module 312 maintains a linking object 250 for each link shown on the display. The links may be between audio elements, between an audio element and other media (non-audio) objects, or between two non-audio objects. The linking module updates, creates, or deletes link objects based on changes to the links. Changing the fields 252, 254, 256, 258 of a link object 250 performs these operations. Such media objects or content items may be stored in the media object storage 320. Such content may include another audio element, a video clip, a web page, a hypertext link, a document, a spreadsheet, a PowerPoint presentation or any other object. The linking module 312 passes the link objects to the applications module 316 with instructions to submit the new element to memory 104.

A reordering module 304 is coupled to the application module 316 and the audio element storage 318 by bus 101. Reordering is initiated when the application module 316 receives the appropriate input from the user. The application module 316 receives an identification of two or more audio objects and a new order for such objects, and sends this information to the reordering module 304. The reordering module 304 retrieves the affected audio elements, modifies their ordinal values to reflect the reordering, and then stores the objects back to the audio element storage 318. The reordering module 304 signals the application module 316 that reordering is complete, and the application module 316 regenerates the user interface for all the affected objects to reflect the reordering.

In this embodiment, the audio element storage 318, the media object storage 320 and the link object storage 322 are shown as portions of memory for storing such respective objects. Those skilled in the art will recognize that that the audio element storage 318, the media object storage 320 and the link object storage 322 may include databases and similar functionality, and may alternately be portions of the data storage device 107.

User Interface

Figure 4A:
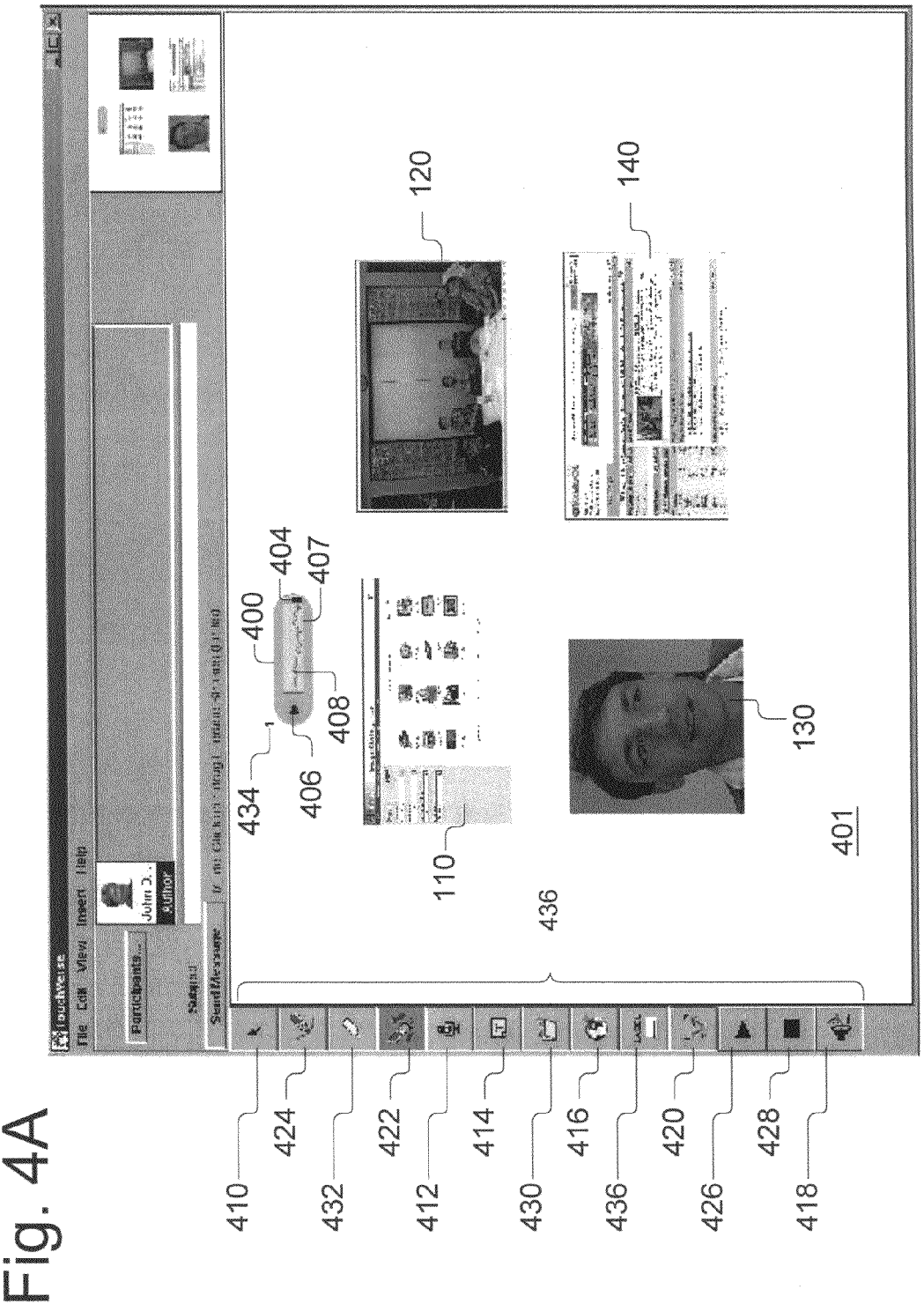
FIG. 4A illustrates a graphical representation of a preferred embodiment of the 2D audio editing interface.

FIG. 4A illustrates one exemplary embodiment of the user interface displayed by the present invention. A visual representation representing an audio element 400 is laid out in a two-dimensional space 401 along with visual representations representing other media objects 110, 120, 130, 140. Although only a single audio element 400 is shown in FIG. 4A for ease of understanding, it should be understood that the present invention can be and is preferably used to present several audio elements in two-dimensional display area 401. Furthermore, the present invention does not require any spatial relationship in the two-dimensional space 401 between audio elements 400 relative to their temporal order, ordinal value or anything else. The audio elements 400 may be place in any order or position the user desires within the two-dimensional space 401. The location of a visual representation representing an audio element (e.g., 400) in the two-dimensional space 401 does not necessarily bear any relation to the audio element's temporal sequence relative to other audio elements. Thus, the visual representations can be organized as preferred by the user. The visual representation of the audio element 400 includes a button 406 corresponding to playback, an ordinal value indicator 434, an audio level gauge 404 indicating raw audio volume, and audio indicator 407.

Figure 4B:
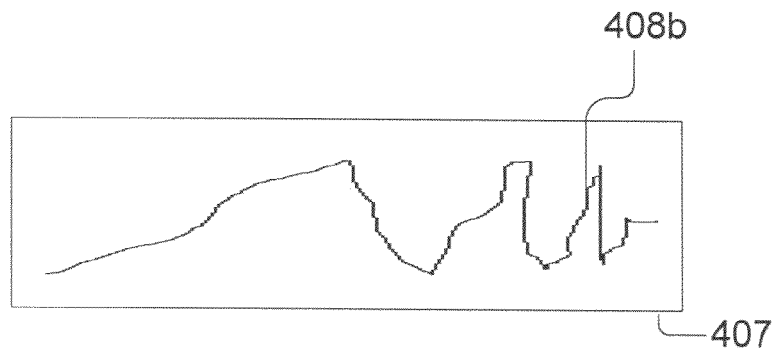
FIG. 4B illustrates a graphical representation of a first embodiment of an audio indicator having a waveform.
Figure 4C:
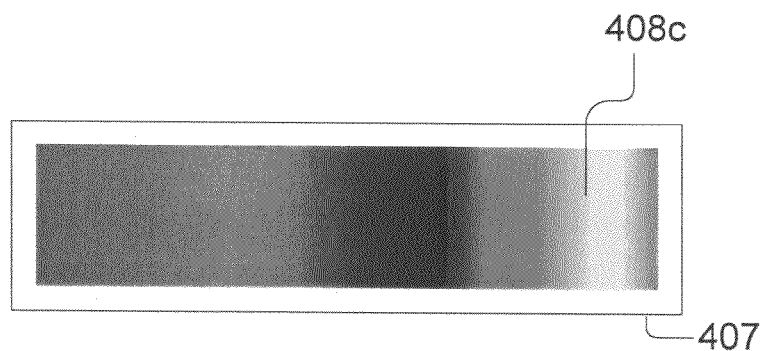
FIG. 4C illustrates a graphical representation of a second embodiment of the audio indicator as a graph of pitch.

The audio indicator 407 in this embodiment represents the audio signal as a waveform graph 408 in which the length along the X-axis represents a time duration measurement and the height upon a Y-axis represents an amplitude measurement. The relationship between time and the X-axis measurement may represent a linear relationship, a logarithmic relationship or any other relationship currently employed in the art. Additionally, the relationship between amplitude and the Y-axis represents may comprise a linear relationship, an exponential relationship (e.g., squared), a logarithmic relationship or any other relationship currently employed in the art. The length of the visual representation 400 corresponds in relative terms to the duration of the audio signal stored in the audio element represented. This may represent a linear relationship, a logarithmic relationship or any other relationship currently employed in the art. As best illustrated in FIG. 4B, the audio indicator 407 is distinct from the waveform 408b, and the waveform is just one of many different graphics that may be used to represent the amplitude. It should be noted that both the waveform 408 and the audio indicator 407 increase in length depending on the audio signals stored or referred to by the element. Referring also now to FIG. 4C, an alternate embodiment is shown where the audio indicator 407 uses a gradient or colors 408c to represent amplitude. For example, red and yellows may be used to represent higher amplitudes and excited sounds whereas blues and darker colors can used to represent lower or quieter sounds.

On the left edge of the two-dimensional space 401 is an array of visual representations or icons 410, 424, 432, 422, 412, 414, 430, 416, 436, 420, 426, 428, 418 corresponding to positional stimulus points. Each of these icons 410, 424, 432, 422, 412, 414, 430, 416, 436, 420, 426, 428, 418 corresponds to a selection operation or an editing function that will be discussed in greater detail below. For example, the first ten icons 410, 424, 432, 422, 412, 414, 430, 416, 436, 420 are used for setting a mode of operation while the last three icons 426, 428, 418 are used to select an action to be taken. Those skilled in the art will recognize that additional positional stimulus points performing other functions may also be presented in tool bars along the top, bottom or right edge of the two-dimensional space 401, or as a floating tool bar.

Cursor Interaction

The application module 316 maintains a (x, y) grid indicating the locations of various visual representations 400 on the two-dimensional interface 401. Additionally, the application module 316 stores the present location of the cursor (not shown) which changes responsive to input from the cursor control 123. When the cursor control 123 or the keyboard 122 sends the appropriate signal when the cursor is positioned over a positional stimulus point, then that stimulus is engaged.

Generally, reference will be made to the "touching or clicking" of visual representations or "positional stimulus points". This process of touching and clicking refers to placing the cursor over the visual representation and physically touching a control on the cursor control 123 or touching the image on a touch-screen. The term "positional stimulus point" refers to range of screen space such that when touching or clicking is detected in that range an application function is initiated. These points are generally represented graphically by visual representation such as thumbnail images, icons, images, etc.

Selection Operator

The interface includes a positional stimulus point 410 corresponding to a selection operator. If the positional stimulus point 410 is engaged, the system enters a mode whereby audio elements 200 can be selected by touching or clicking the positional stimulus point corresponding to the audio element 200. Additionally, the selection operator can be applied to designated points or temporal ranges within an audio element by touching, clicking, or dragging across a section of a waveform corresponding to the desired point or temporal range. After a visual representation has been selected, when positional stimulus points relating to particular functions are engaged, the desired function will be applied to the designated visual representation.

Function Buttons

An array of positional stimulus points 410, 424, 432, 422, 412, 414, 430, 416, 436, 420, 426, 428, 418 relating to various editing functions are present on the user interface 401. These functions may include: playing an element, creating an element, deleting an element, reordering elements, linking elements, and splitting elements. Icon 410 sets a mode where the pointing device 123 can be used for selecting objects and setting markers or points. Icon 424 is used for setting a mode where the pointing device 123 draws lines including for the purpose of creating links between two audio elements, or an audio element 400 and other objects 110, 120, 130, 140. Icon 432 is used for setting a mode where the pointing device 123 can add highlights over any object or portion of display area 401. Icon 422 is used for setting a mode where the pointing device 123 deletes highlighting or lines that have been added to the display area 401. Icon 412 is used for setting a mode where the pointing device 123 creates new audio elements and records audio input. Icon 414 is used for setting a mode where the pointing device 123 and keyboard 122 can be used to add text boxes for multiple lines of text with wrapping. Icon 430 is used for setting a mode where the pointing device 123 can be used to open a file. Such an action would create an image of the file and add it to the two-dimensional space 401. Icon 416 is used for setting a mode where the pointing device 123 can be used to add a hypertext link or a reference to a web page. Icon 436 is used for setting a mode where the pointing device 123 and keyboard 122 add a label to an object. Icon 420 is used for setting a mode where the pointing device 123 can be used to reorder audio elements. Icon 426 is used to start a play operation for a selected audio element or the lowest ordinal valued element if one is not selected. Icon 428 is used to stop the output of audio by the system. Finally, icon 418 is used to perform a split operation. These functions are performed by designating the location or element 400 on which they are to be performed by applying the selection operator to a location, element icon, or audio indicator 407 and touching or clicking the positional stimulus point corresponding to the desired function. The use of these functions is discussed in greater detail below.

Updating the Display

The display is updated, when the application module 316 receives information from one of the function modules 302, 304, 306, 308, 310, 312, 314 indicating a change in status for one of the audio elements or one of the link objects. The application module 316 modifies the user interface and the sends a signal reflecting the changes for display on the display device 100. In one embodiment, the application module 316 maintains a list of each audio element that is part of a user interface 401 and a list of link objects associated with any of the audio elements in the list. Each time any one of the audio elements on the list or link between objects is modified by a write operation to the audio element storage 318, the media object storage 320 or the link object storage 322, the application module 316 retrieves each audio element in the list and generates a new image according to the data retrieved. These features are discussed in greater detail below.

Creating New Audio Elements

Figure 5A:
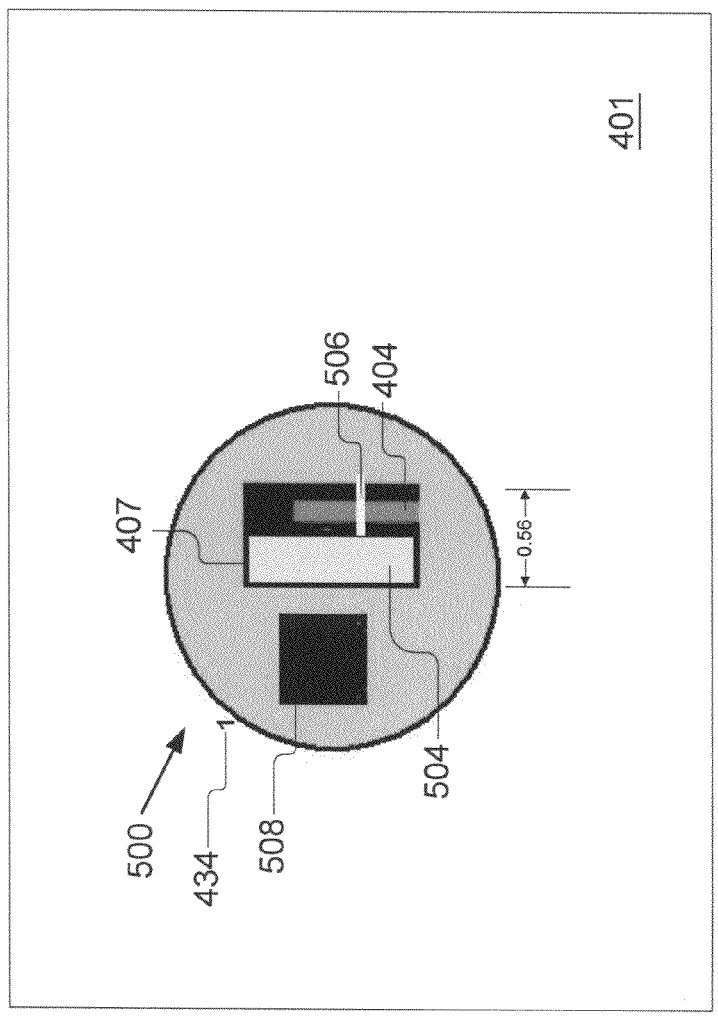
FIGS. 5A-5C illustrate graphical representations of a preferred embodiment of the user interface at different times in the audio recording process.
Figure 5B:
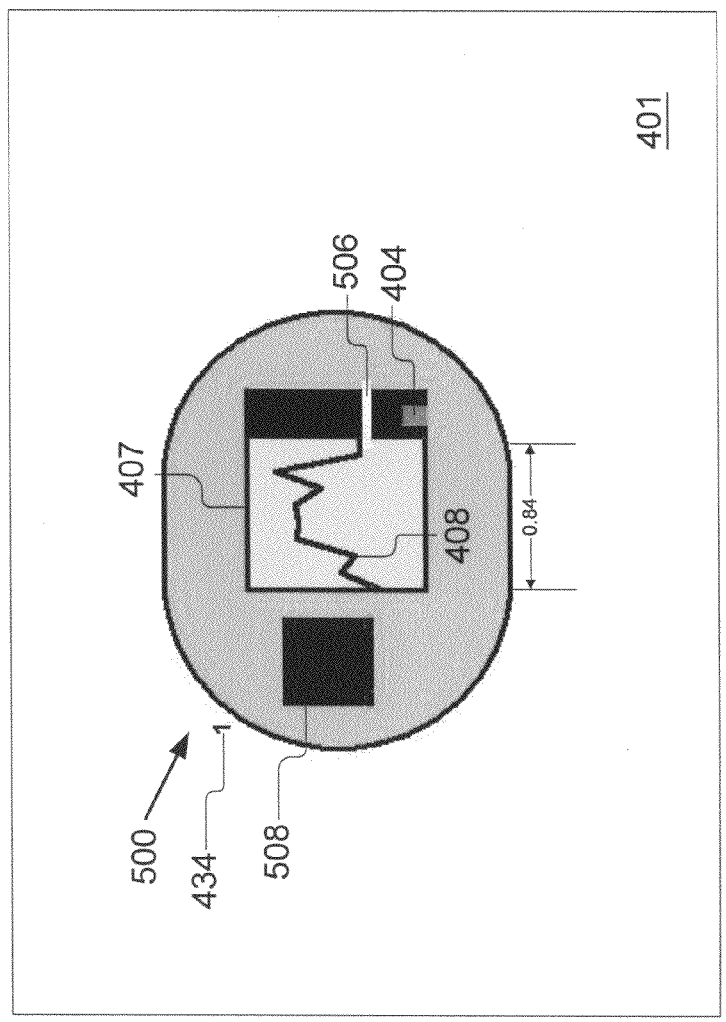
Figure 5C:
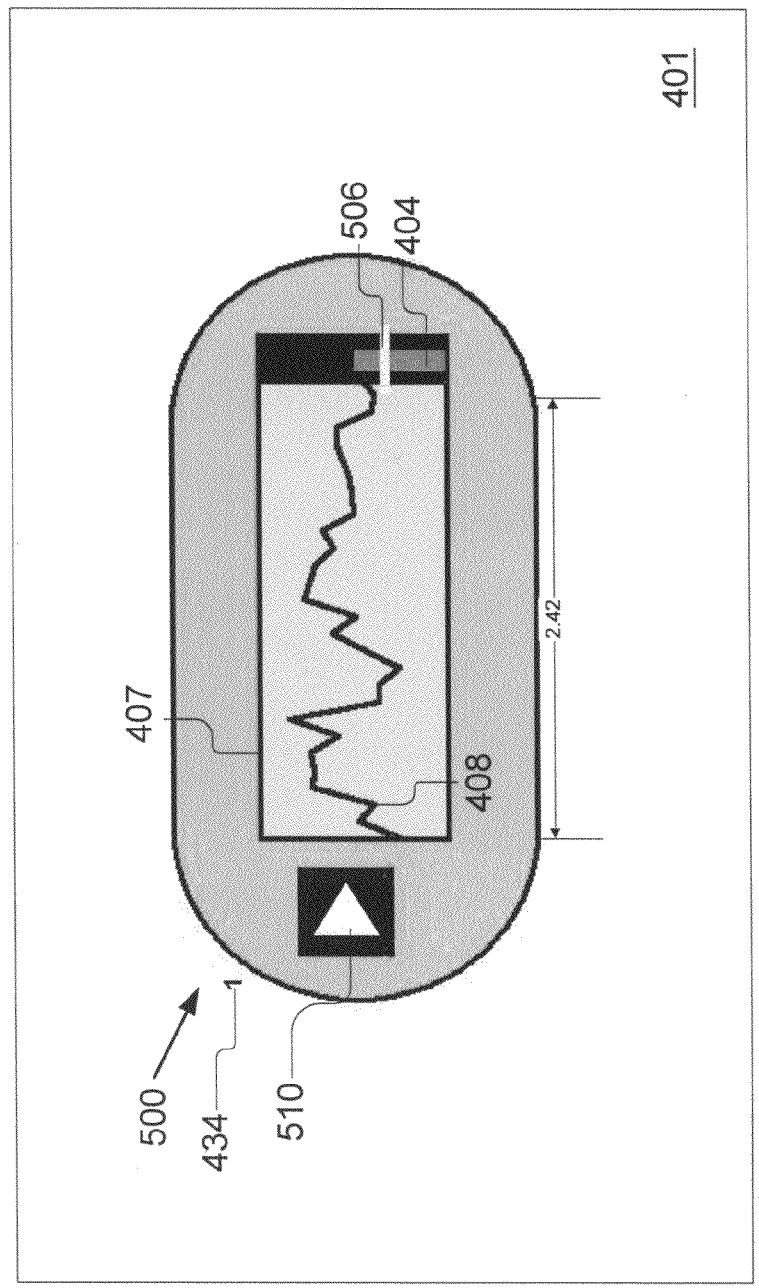

FIGS. 5A-5C illustrate graphical representations of preferred embodiments of the audio element creation process. Additionally, the process steps are illustrated as a flowchart in FIG. 9. The process begins when the system receives input in the form of selection 900 of the positional stimulus point corresponding to the creation function 412. The user clicks or touches upon the visual representation 412 to switch into creation mode. Then additional input from the user as to a screen location 902 for the new element is also received by the system. The system may also prompt for an ordinal value for the new element. If no ordinal value is provided, the application module 316 reads the memory 104 and identifies the next available ordinal value. If the request includes an ordinal value already in use, the application module 316 retrieves the audio elements of all elements having the same or higher ordinal values as the one requested, increases their ordinal values by one (as will be discussed in more detail below for reordering) and stores the audio elements back to memory 104. The audio gauge 404 displays an amplitude level of the detected audio signal. The audio threshold 506 may be adjusted 904 to insure that recording occurs by comparing the threshold to the volume level displayed on the gauge. Although step 904 has been described as the third input received, the audio threshold 506 may be adjusted 904 at any time during the recording process of FIG. 9. The application module 316 sends the request along with the ordinal and spatial information to the element creation module (ECM) 302 which creates 906 a new audio element having an empty audio data 204 field and the designated ordinal and spatial values in those respective fields 206, 210. A visual representation 500 representing the new audio element is generated, having no waveform 504 in the audio indicator 407, an audio gauge 404 and positional stimulus points for stopping recording 508 and adjusting the audio threshold 506. In an alternate embodiment, a visual representation of an audio element is generated having a positional stimulus point for recording, which must be touched or clicked before the system begins to collect audio input. When sound is received at the audio device 125, it is passed 908 to the application module 316. The application module 316 passes this audio data to the element creation module 302, which in turn records, logs or stores 910 the audio data in the audio data field 204 of the audio element 200. For example, the sound data may be stored to data storage 107 as needed. As sound is recorded, a waveform 408 is generated and updated within the visual representation 500 representing the audio element as shown in FIGS. 5B and 5C. Additionally, as the recording proceeds, the length of the waveform 408 and the length of visual representation 500 representing the audio element increase. This can be seen by the different lengths of the visual representation 500 in FIGS. 5A-C. Next in step 912, the process determines whether the user has selected the stop button 508. If the user has selected the stop button 508 then the method continues in step 916. In step 916, the element creation module 302 sends 916 the new element back to the application module 316 that stores 918 it in memory 104. On the other hand, if the user has not selected the stop button 508, the method determines if the user has selected the "create new audio element" button 412. This indicates the user is finished creating the current element and wants to create another audio element. If so, the method continues in step 916 as has been described above. Otherwise, the method continues in step 914 to determine whether the input audio has a level above the threshold 506. If so, the method loops back to continue receiving 908 audio and storing 910 the received audio. If the input audio does has a level above the threshold 506, as shown in FIG. 5B, then the process continues to step 920. In step 920, the element creation module 302 stops recording until the audio input level is above the threshold. Once the audio input level is above the threshold, the process continues by receiving 908 audio and storing 910 the received audio as illustrated by FIG. 5C. Those skilled in the art will recognize that the operation of the recording feature of the present invention could be modified so that the process proceeds to step 916 and finishes creating the audio element if the audio input falls below the threshold for a pre-determined time period as shown in FIG. 5B.

Another embodiment of the recording or element creation process is one where the system is set to an "auto-record" mode. The system may default to such a state or enter it responsive to user input. A threshold 56 may be set by clicking or touching the appropriate positional stimulus points 506. The threshold 506 may be tested beforehand by comparing it to the volume levels measured by the volume gauge 404. A heuristic is employed by the element creation module 302 to determine the location for the visual representation representing the new element. One heuristic places the newly created audio element in the first open region at least 10 pixels lower on the Y axis and at the same X coordinate as the most recently added audio element, or in the upper left corner if no audio element has yet been added. Recording is initiated when audio is detected above the threshold 506. Once recording begins, it continues as described in the paragraph above. Those skilled in the art will recognize that multiple audio elements may be created in this manner with the end of each audio element or segment determined as described above being dependent on a specified amount of time during which the audio input is below the threshold.

Playback of Audio Elements

Figure 6A:
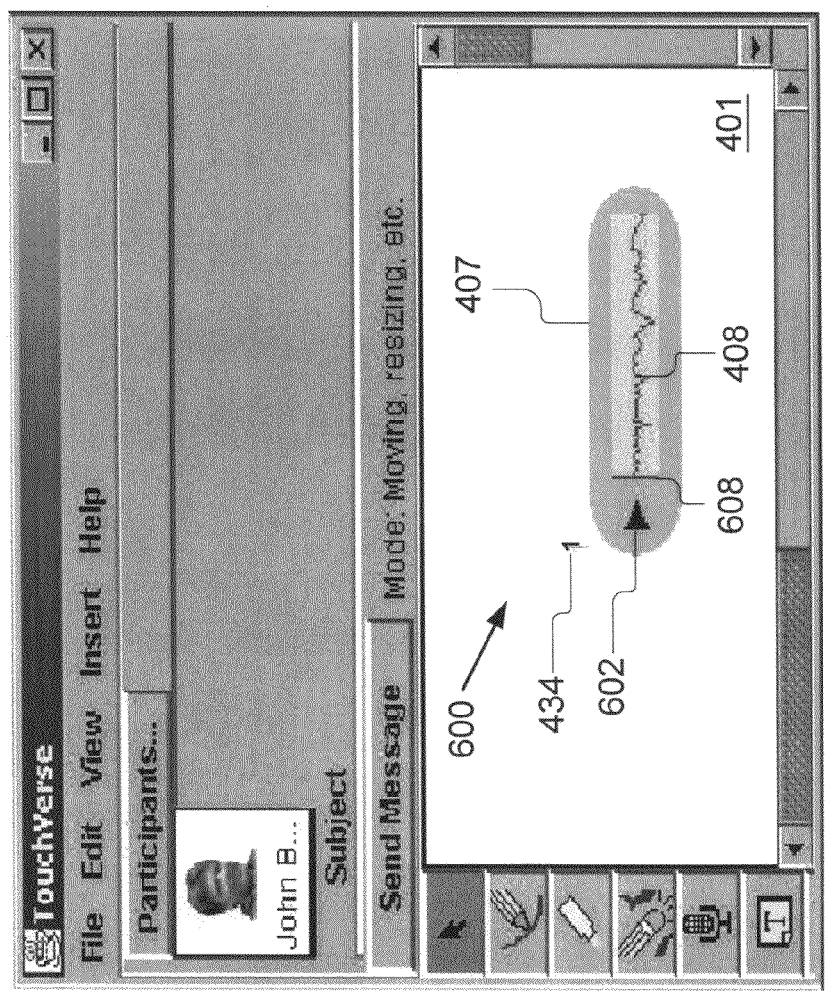
FIGS. 6A-6C illustrate graphical representations of a preferred embodiment of the user interface at different times in the audio playback process.
Figure 6B:
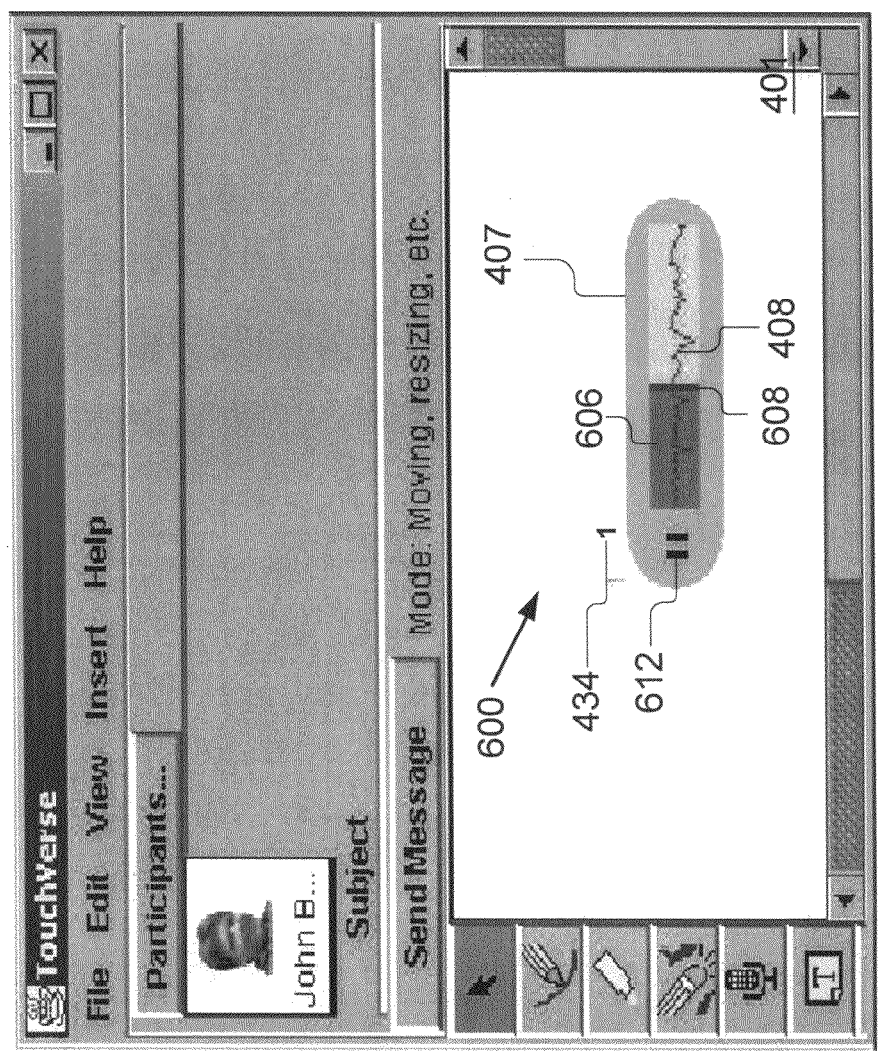
Figure 6C:
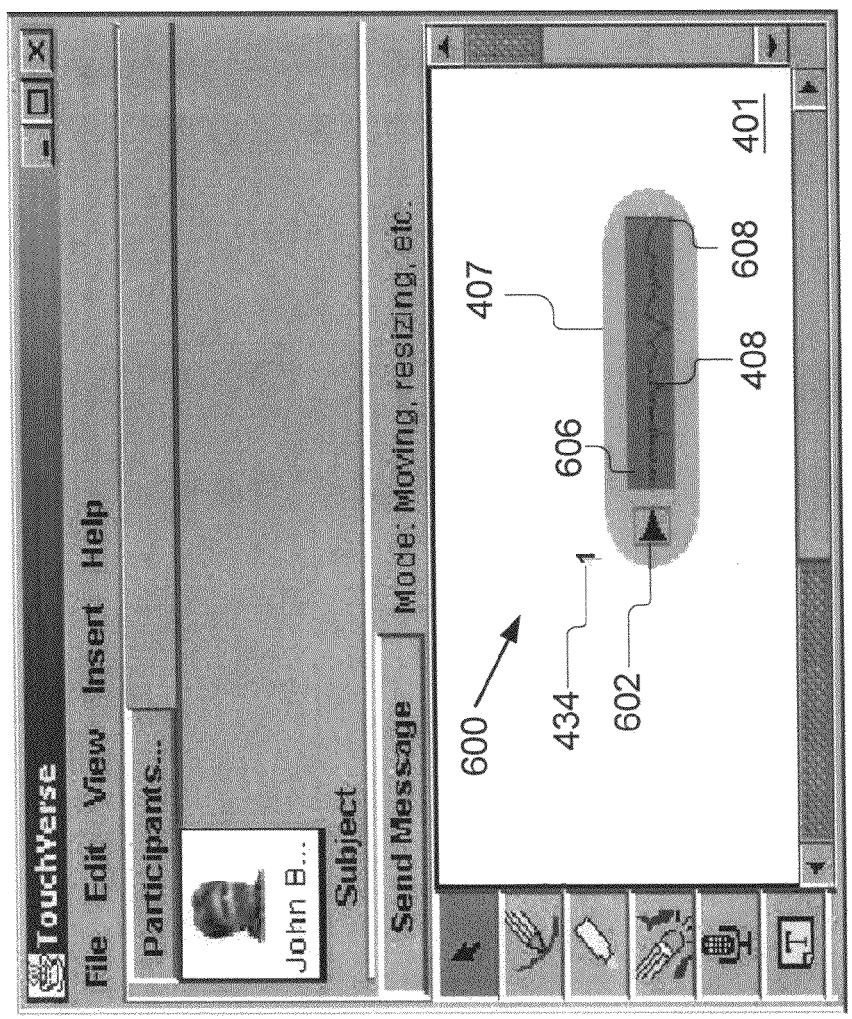

FIGS. 6A-6C illustrate graphical representations of a preferred embodiment of the user interface 401 during the playback process. Additionally, the playback process is further illustrated as a flowchart in FIGS. 10A and 10B. Playback begins when the positional stimulus point 602 corresponding to playback is touched or clicked 1000 on the visual representation 600 corresponding to the element to be played (e.g., the user clicks on the play button 602) or the visual representation 426 corresponding to the play action on the tool bar. The application module 316 retrieves 1002 the selected audio element 200 from memory 104 and passes it to the playback module 314. The playback module 314 retrieves 1004 the audio data from the audio data field 204 of the audio element 200 and passes it to the application module 316, which outputs 1006 it to the audio device 125. The audio is output from a beginning point set by the user and indicated by a vertical line 608 over a point of the waveform 408. If the audio data field 204 stores a pointer, the file indicated by the pointer is retrieved and data from that file is output by the application module 316. Playback may be ended by engaging the positional stimulus point 612 corresponding to stopping 603, which replaces the playback positional stimulus point 602 when playback is initiated (See FIG. 6B). In one embodiment, as the audio is played, the color or shading 606 of the waveform 408 changes 1008 to indicate which sections of the waveform 608 have been played. For example, if the first 30 seconds of an audio element were to be played, the section of the waveform representing t=0 to t=30 would be represented in a different color than the remainder of the waveform 408 as illustrated in FIG. 6B. The shading starts from the beginning point set by the user and as audio is output the position of the vertical line 608 is also updated on the display to correspond to the output of audio and the shading 606. In another embodiment areas that have been played would be highlighted. Such highlight can be seen by the differences in shading 606 of the waveform 408 between FIGS. 6B and 6C. The process continues in step 1010 to test whether the end of the audio element has been reached. If not, the method checks to see 1011 whether the user has pressed button 412 to create a new audio element. If so, the method ends the playback process in step 1014. If not the method continues in step 1012 to test whether the user input a stop command. If the user input a stop command, the process returns to reading and outputting audio data in step 1004. If a stop command has been input, the play back process is complete 1014 and ends.

If in step 1010, it was determined that end of the audio element has been reached, the method determines 1016 if another audio element exists that has a greater ordinal number. The present invention continues to play other audio elements increasing by ordinal number. If there is not another audio element with ordinal number greater than the current audio element, the play back process is complete 1014 and ends. Otherwise, the next element with an ordinal number of one plus the ordinal number of the current element is determined 1018 and the next audio element is retrieved 1020 by the application module 316 and passed to the playback module 314. After step 1020, the method continues in 1004 to read and output audio data. The system continues to play successive audio elements until the positional stimulus corresponding to stopping 603 is touched or clicked, or the audio element having the highest ordinal value has been played, or the audio creation button 412 has been pressed. Those skilled in the art will realize that even though FIGS. 6A-6C do not show the audio gauge 404 and an audio threshold 506, such may be included in the visual representation 600 representing an audio element 200 during playback. Moreover, the audio gauge 404 could be changed as the audio output is provided to show the amplitude of the audio. In one environment, if a link object exists designating the currently playing audio object in the "from" field of the link object 256, the system will display or play the media object or portion thereof identified as the "to" object 252 in the link element in connection with playing the audio specified in the interval field 258 of the link object. The present invention also allows the user to jump to particular portions for output during playback. During playback, if the user clicks on a new point in the waveform, the method of the present invention advantageously steps audio play to the position in the waveform selected, thereby allowing the user to browse audio.

Joining Multiple Audio Elements

Figure 7A:
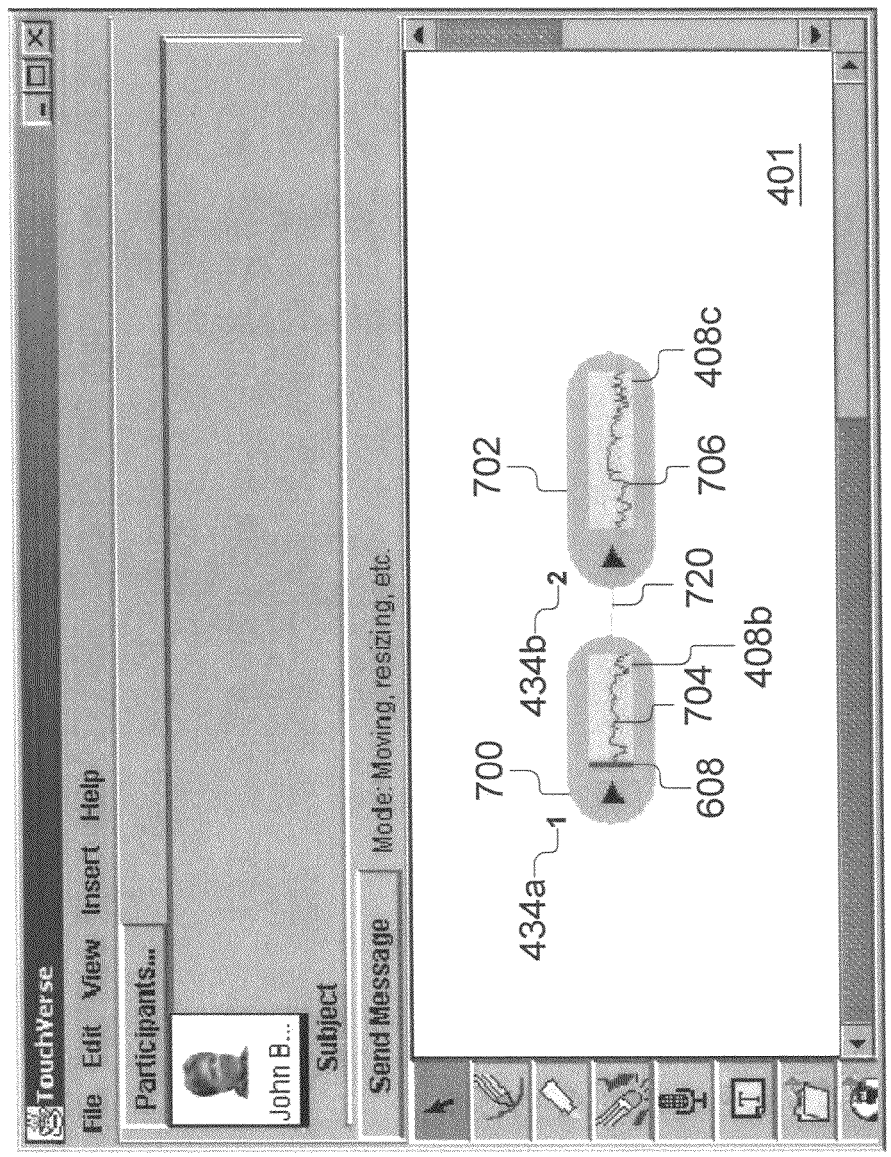
FIGS. 7A-7B illustrate graphical representation of a preferred embodiment of the user interface at different times in the joining process.
Figure 7B:
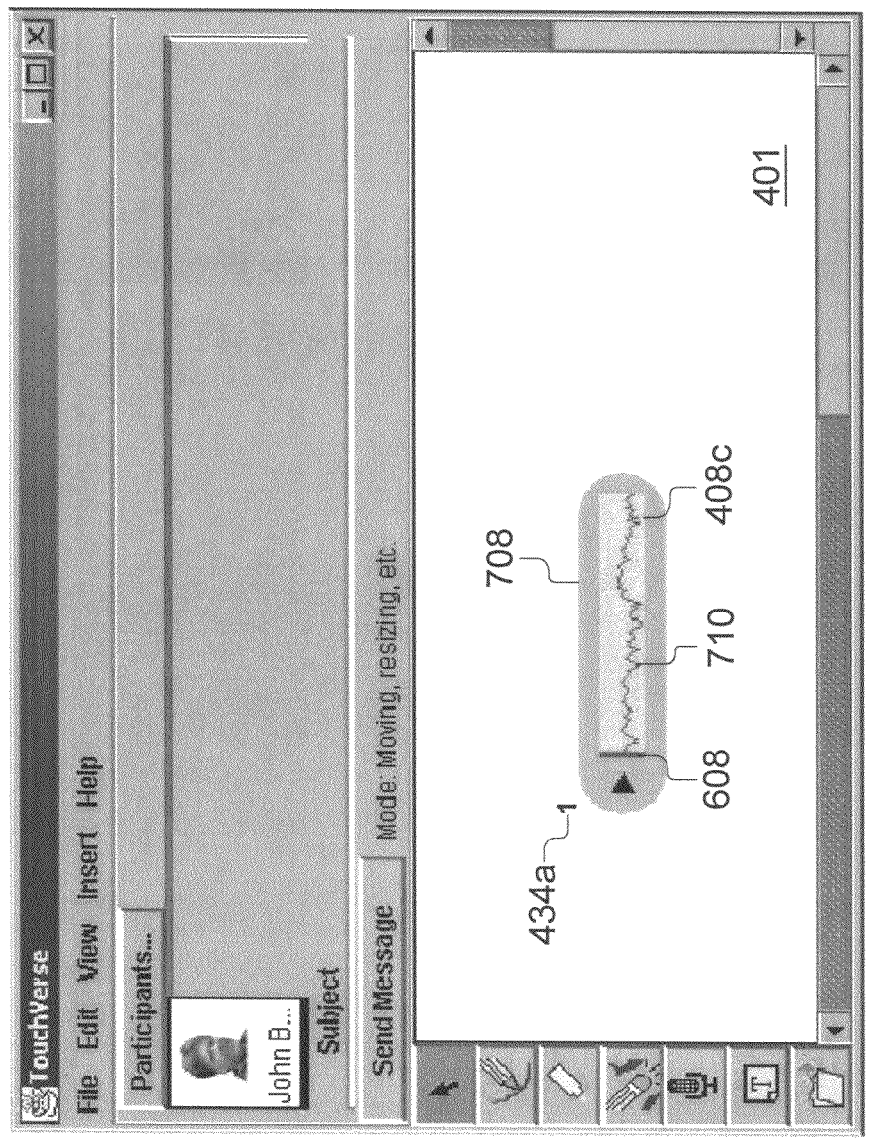

FIGS. 7A-7B illustrate graphical representations of audio elements before and after a join operation. Additionally, the process steps are shown in a flowchart in FIG. 11. The method begins by selecting 1102 a join operation or mode and identifying two audio elements 700, 702 to be joined. These audio elements 700, 702 are identified as a first audio element and a second audio element for the joining process described below. In one embodiment, as shown in FIGS. 7A and 7B, the join operation is initiated by selecting a joining mode, and a connecting line 720 representing the sequential relation of two audio elements. The audio element with the lower ordinal number is set to the first audio element of the join operation and the audio element with the higher ordinal number is set to the second audio element of the join operation. In another embodiment, clicking or touching a positional stimulus point corresponding to a join operation, and selecting two audio elements using the pointing device 123 initiates joining. The audio elements are set to be the first and second audio element based on the order in which they are selected. In yet another embodiment, clicking or touching a positional stimulus point 424 corresponding to line drawing (See FIG. 4); and a drawing a line between two audio elements initiates joining. The audio element from which the line is drawn is set to the first audio element and the element to which the line is drawn is set to the second audio element. In still another embodiment, the joining process may be initiated by dragging one audio element visual representation 702 on top of another audio element visual representation 700. The audio element 702 dragged or placed upon the other element is set to be the second audio element and the other is set as the first audio element.

When the process is initiated, the application module 316 retrieves 1106 the two selected audio elements from the audio element storage 318 of the memory 104 and sends 1108 them to the joining module 310. The joining module 310 retrieves 1112 the audio data field 204 of the second audio element. Then the joining module 310 appends 1114 the retrieved audio data from the second audio object to the existing audio data in the audio data field of the first audio element. The link objects referring to the second audio element are modified 1116 to refer to the first audio element with the interval adjusted accordingly. Included as part of this move is an adjustment in the linking position of the audio data to account for the appending operation above. After being modified, the link will be to the temporal range corresponding to the audio data to which it was originally linked. Next, the ordinal value of the first audio element is modified if necessary. In the case where the first audio element has a lower ordinal value that the second audio element, no change is necessary. However, if the first audio element has a higher ordinal value that the second audio element, the ordinal value of the first audio element is modified to be the same as the second. For example, if two 60-second audio elements were joined, the new audio element would comprise a single 120-second long audio element with the first 60 seconds containing the audio data of the original audio element with a lower ordinal value and the second 60 seconds containing the audio data of the original audio element with a higher ordinal value. Then the joining module 310 passes 1120 the modified first audio element back to the application module 316. The application module 316 stores 1122 the new audio element to audio element storage 318 and instructs the application module 316 to delete the second audio elements from the memory 104 and update the ordinal values of the remaining modules. Those audio elements whose ordinal values were higher than that of the higher of the two original audio elements have their ordinal values reduced by one. Additionally, the visual representation for the second audio elements 702 is removed from the display. A new visual representation 708 representing the modified first audio element appears in the location previously held by the original audio element having the lower ordinal value, as shown in FIG. 7B. In embodiments in which the X-axis of the waveforms are directly proportional to a time measurement, the new waveform 710 will appear as a horizontally affixed combination of the original waveforms 704, 706.

In one embodiment of the joining function, one or more of the audio elements to be joined contains audio data stored in a compressed format such as the MPEG layer 3 (mp3) or Real Audio (ra) formats. In this embodiment, the joining module 310 first decompresses the compressed audio element(s). The uncompressed audio elements are then joined. If two audio elements with data compressed in the same format are joined, the modified audio element is compressed in that same format. If the system receives a request to join audio elements that have been compressed in different formats or attempts to join an uncompressed element with a compressed element, the system will employ a heuristic to determine the format of the new audio element. In one embodiment, when users attempt to join audio elements with disparate forms of compression, the user will be prompted to designate the desired format, which may be either of the original compression formats or an entirely different audio format. In another embodiment, the new audio element will always be uncompressed. In yet another embodiment, the compressed format of the audio element to which data is being appended will be used as the compression format. Those skilled in the art will recognize that the basic join operation of the present invention described above may be modified to accept compressed data from either original audio element, and create a new audio element storing the audio data in either compressed or uncompressed formats. Furthermore, the user may be prompted for selection of compressed or uncompressed format for the new audio element as well as the compression type.

Splitting Audio Elements

Figure 8A:
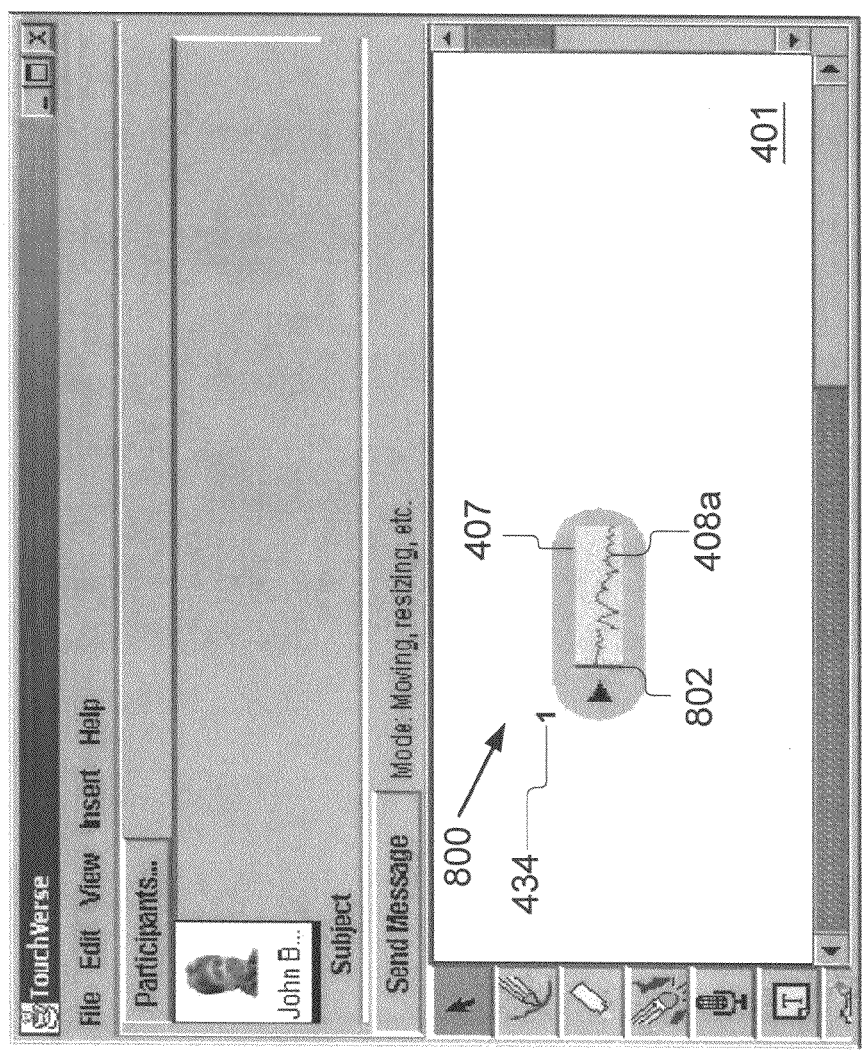
FIGS. 8A-8C illustrate graphical representations a preferred embodiment of the user interface at different times in the splitting process.
Figure 8B:
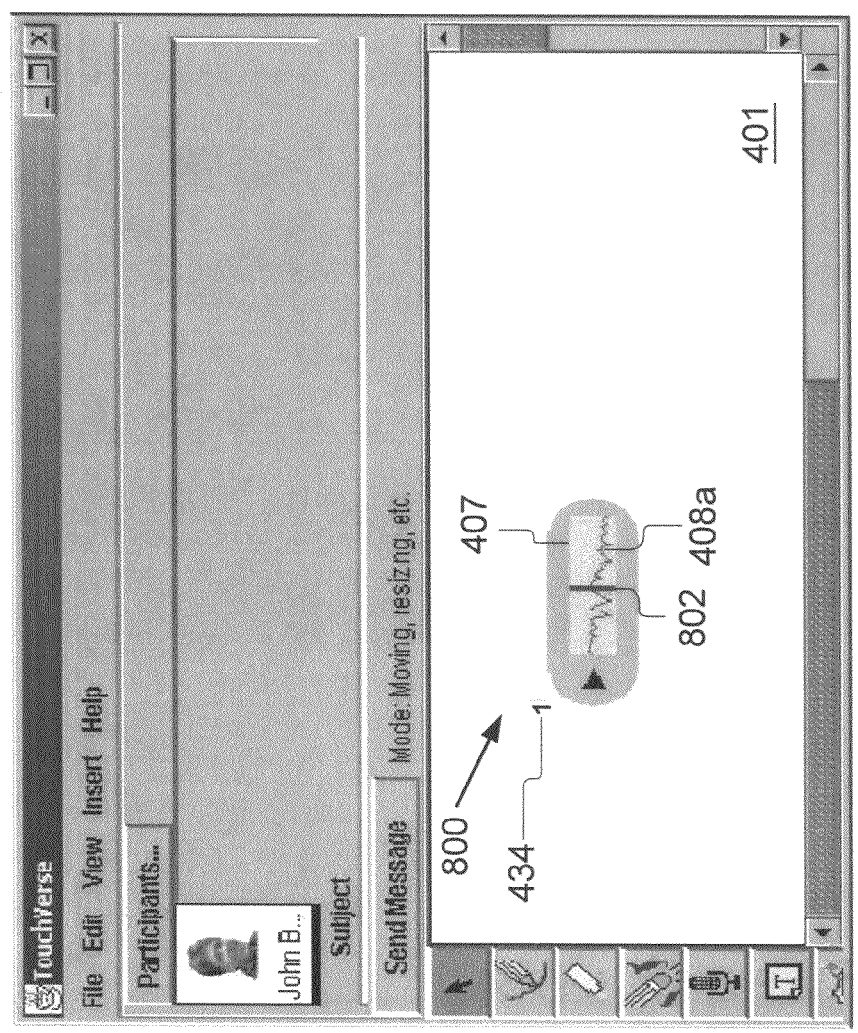
Figure 8C:
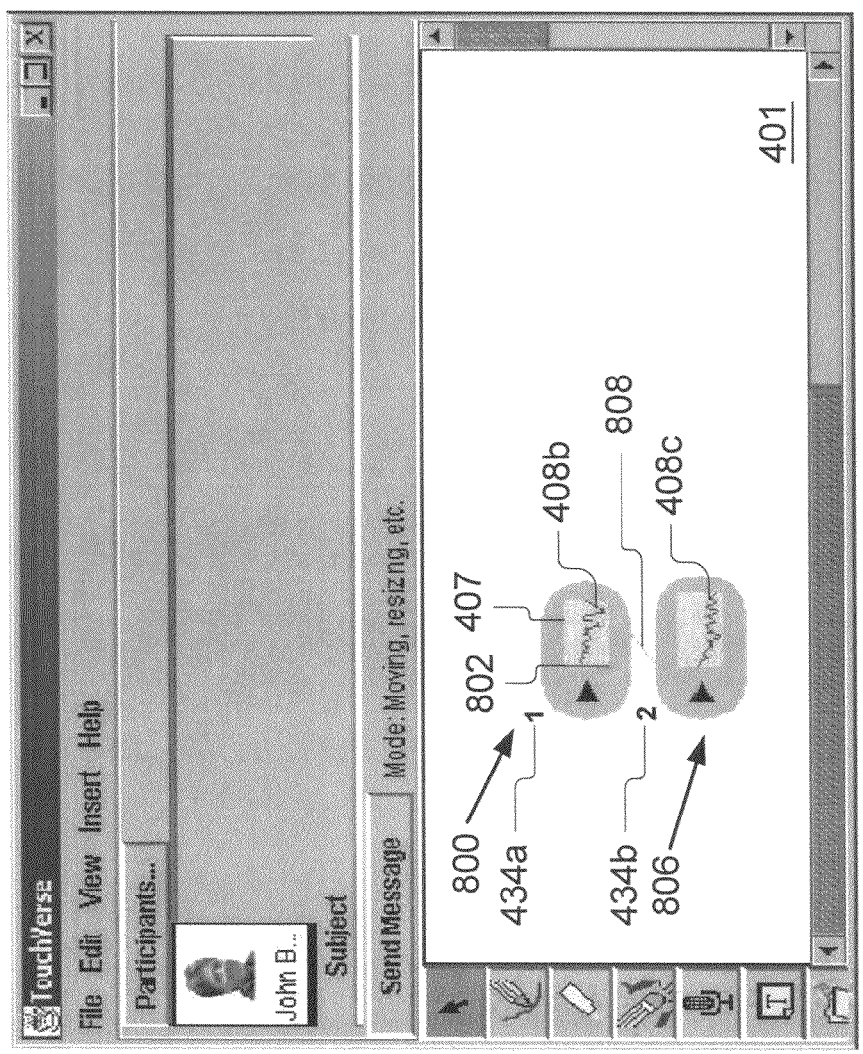
Figure 9:
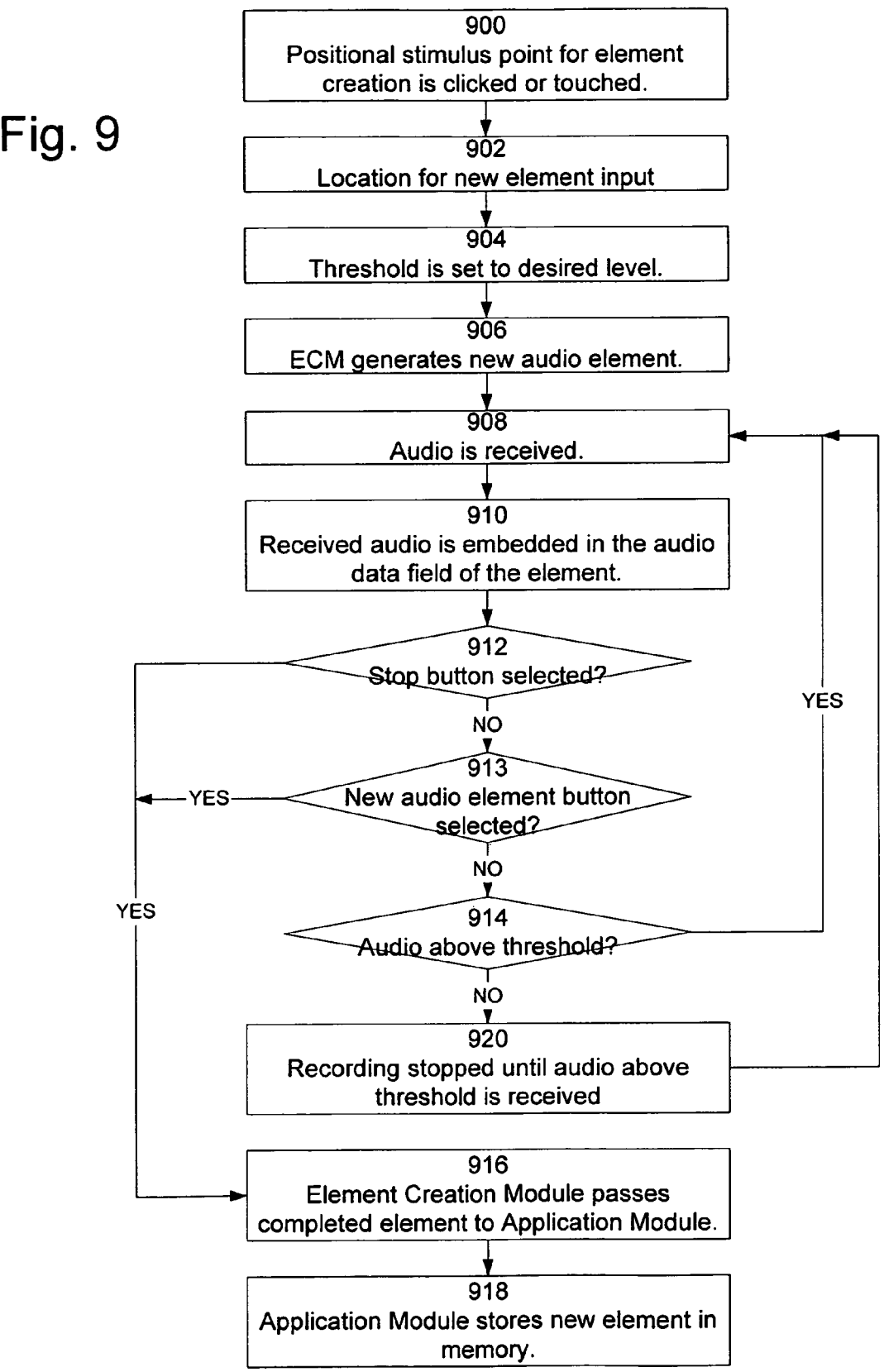
FIG. 9 is a flowchart of a preferred method for creating new audio elements.
Figure 10A:
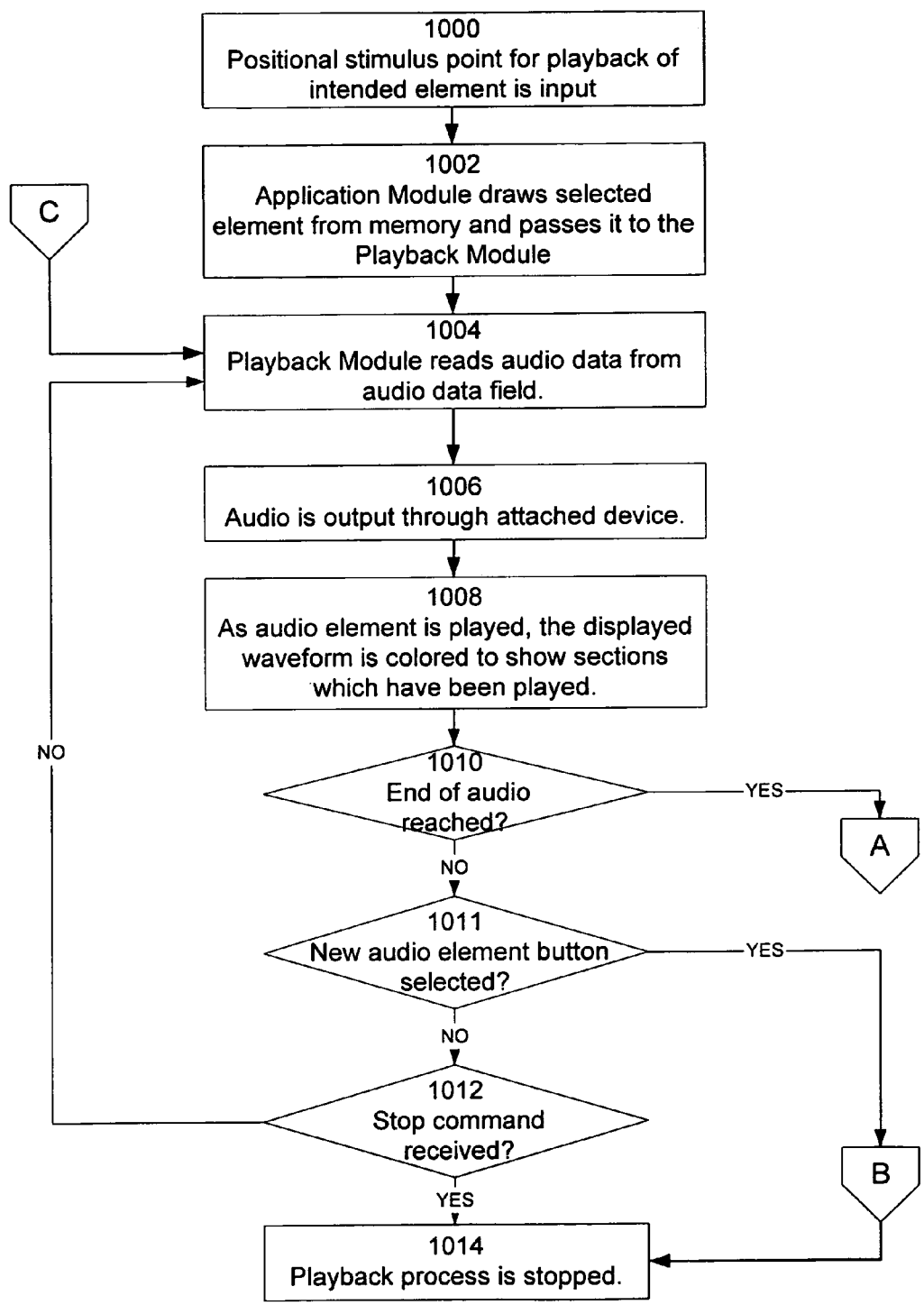
FIGS. 10A-10B are flowcharts of a preferred method for playing audio elements.
Figure 10B:
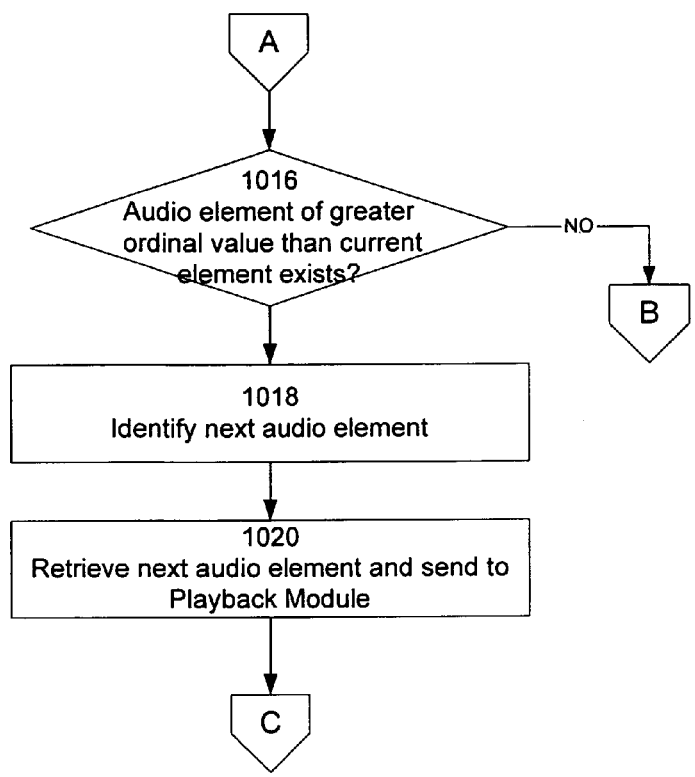
Figure 11:
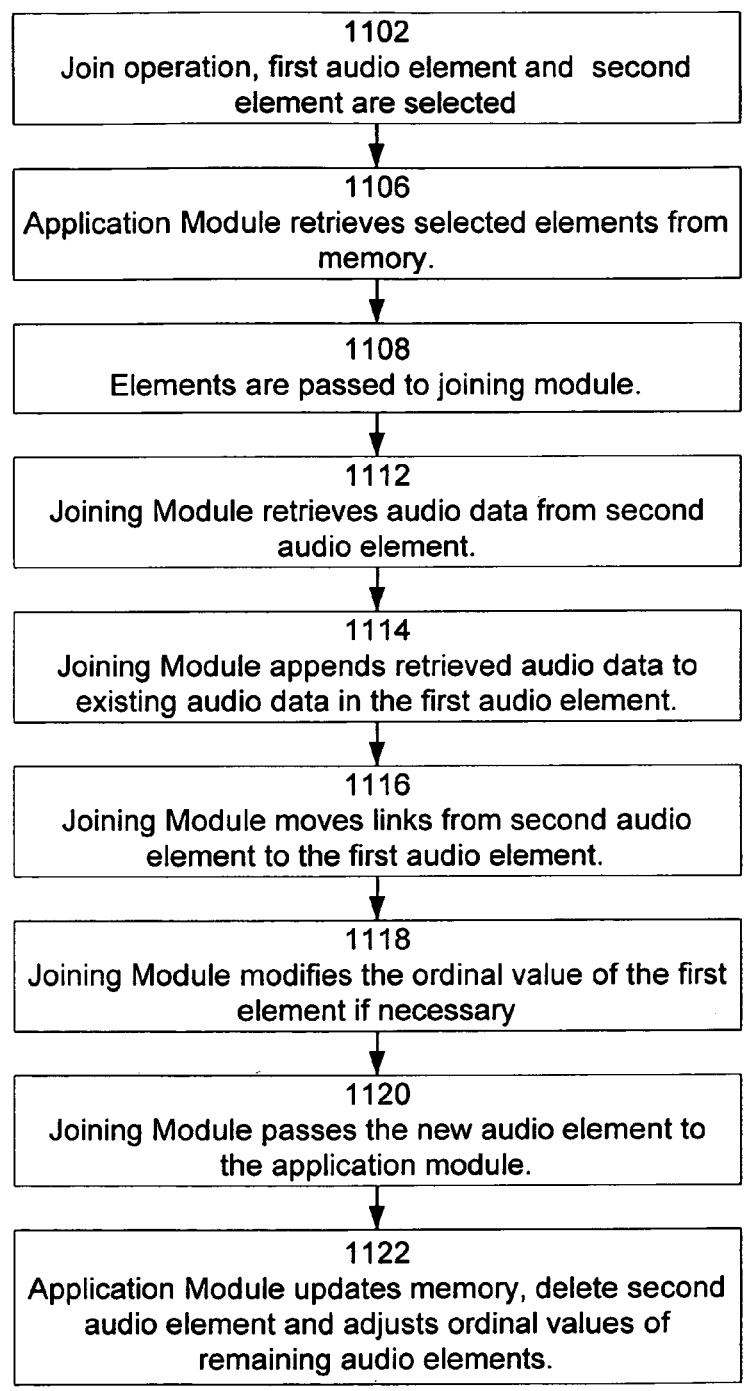
FIG. 11 is a flowchart of a preferred method for joining audio elements
Figure 12:
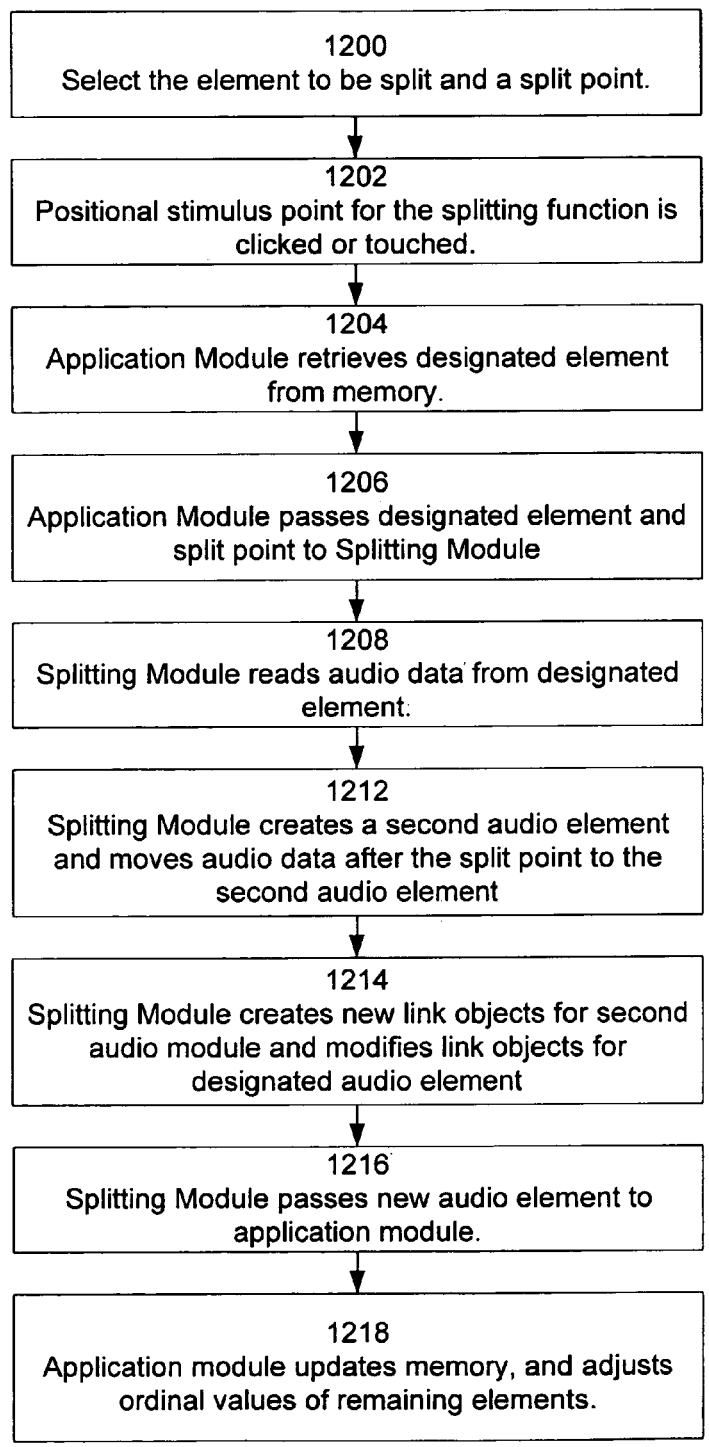
FIG. 12 is a flowchart of a preferred method for splitting audio elements.
Figure 13:
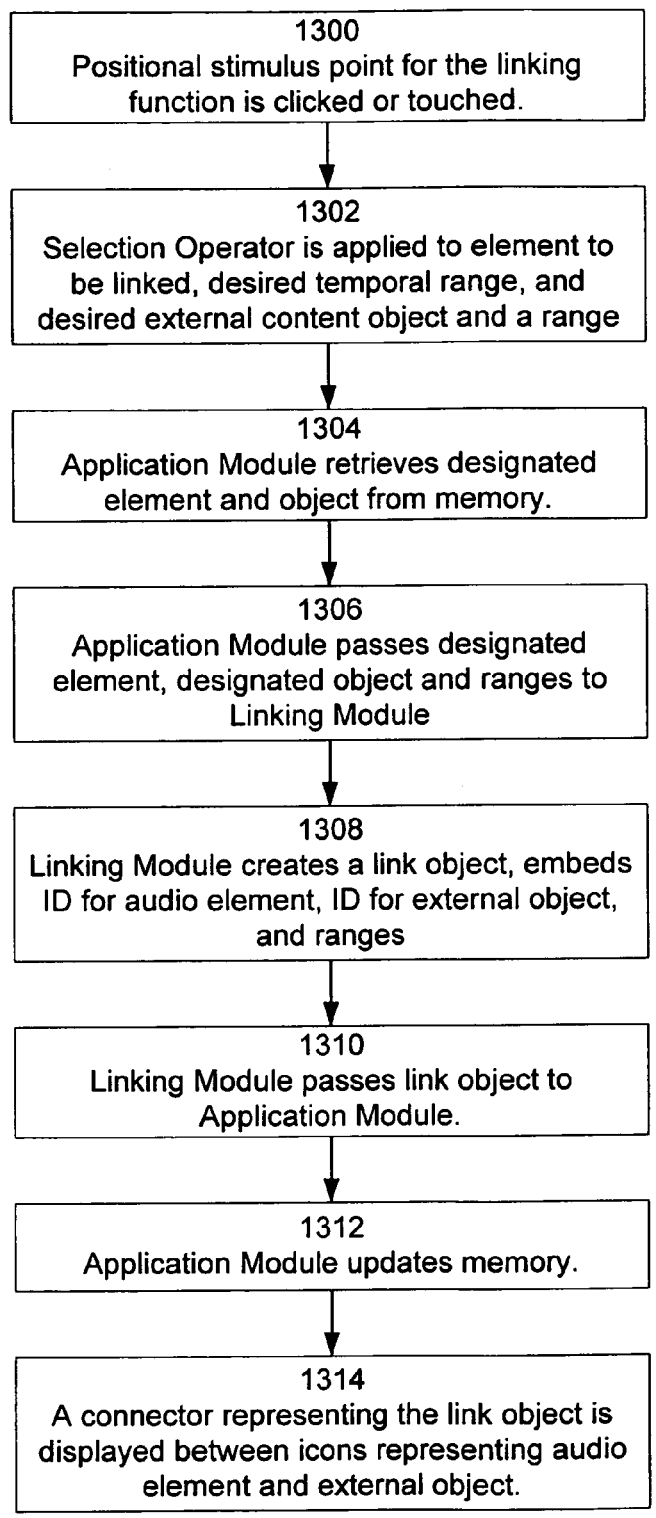
FIG. 13 is a flowchart of a preferred method for linking audio elements to media objects.
Figure 14A:
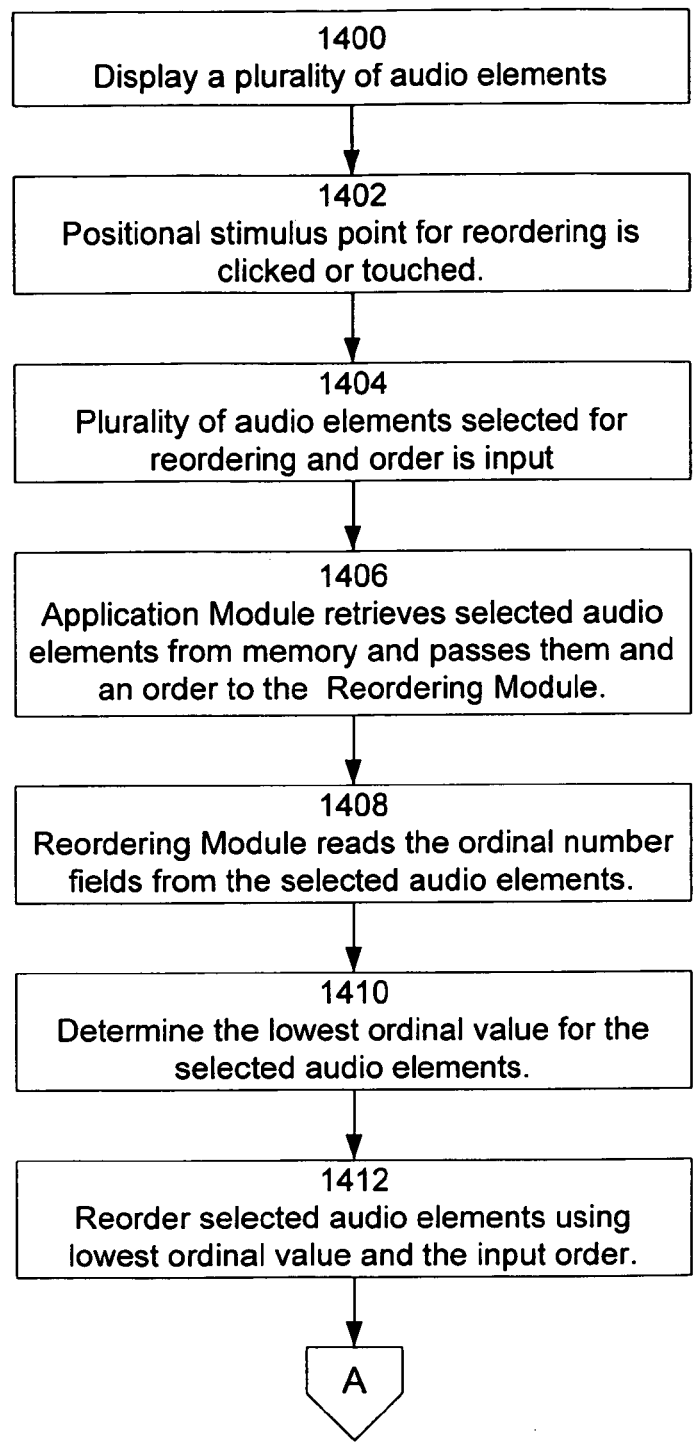
FIGS. 14A-14C are flowcharts of a preferred method for reordering audio elements.
Figure 14B:
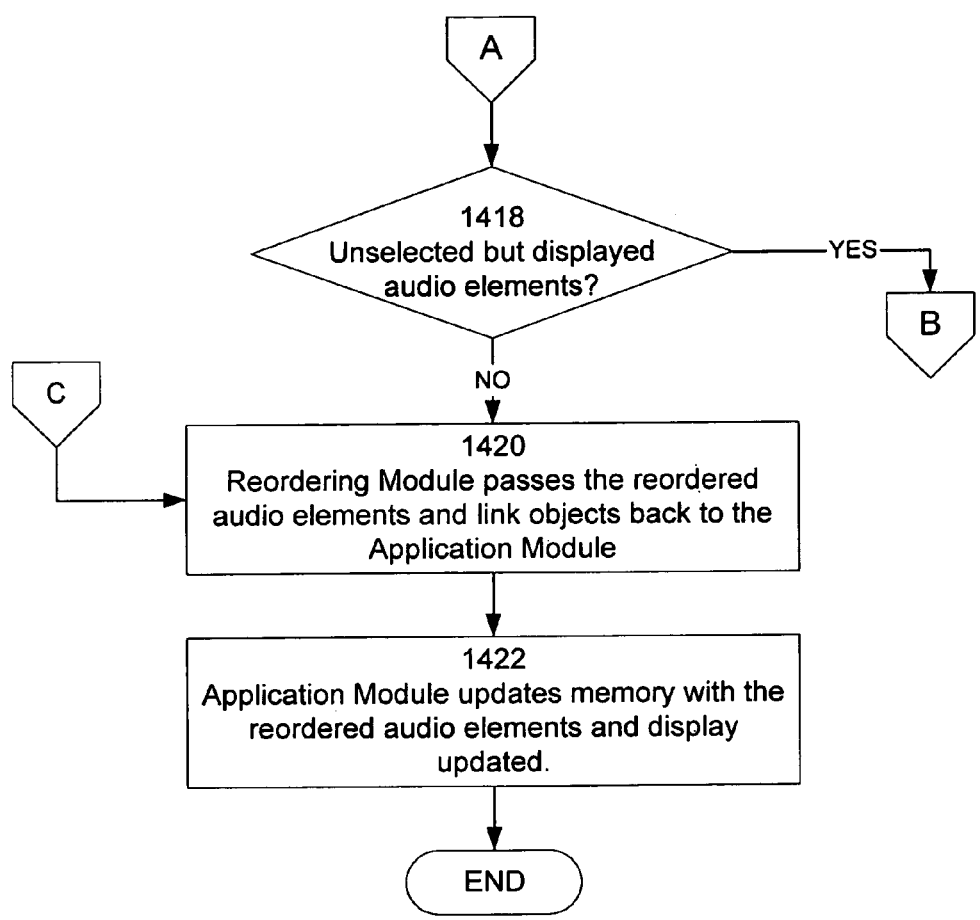
Figure 14C:
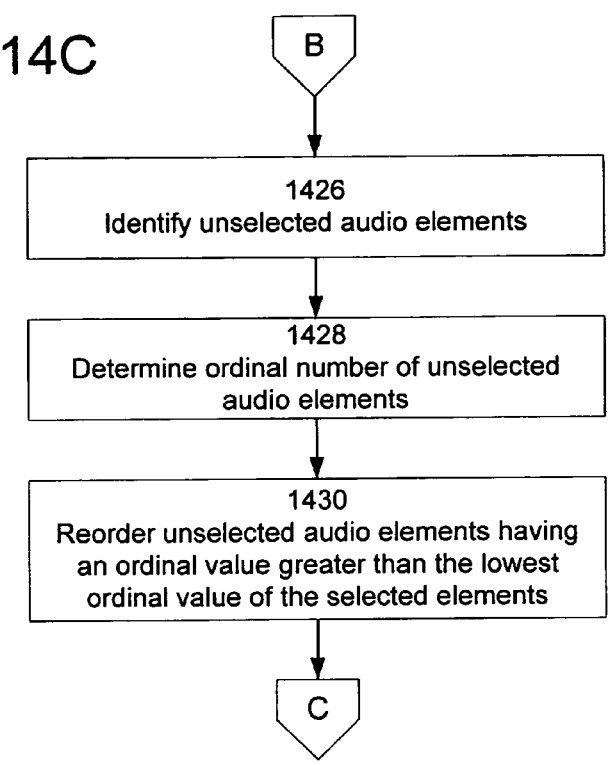

FIGS. 8A-8C illustrate graphical representations of audio elements before and after the splitting process. Additionally, the process steps are described in the flowchart shown in FIG. 12. The process begins with the display of an audio element 800 having an ordinal number 434 and an audio indicator 407 with a waveform 408a as shown in FIG. 8A. The audio element 800 includes a selection point 802 referenced by a vertical line in the audio waveform 408a. The system receives 1200 input in the form of the selection operator being applied to the visual representation 800 corresponding to the desired element and a location on its waveform 408a corresponding to the desired split point 802. For example, as shown in FIG. 8B, the selection point 802 may be positioned anywhere along the waveform 408a where the user would like to split the audio element 800. In FIG. 8B, the selection point 802 is positioned near the middle of the waveform. Although not shown in FIGS. 8A-8C, the user next touches or clicks 1202 the positional stimulus 418 corresponding to the splitting function. The application module 316 retrieves 1204 the designated audio element 800 from memory 104 and passes 1206 the element 800 and a split point 802 to the splitting module 308.

The splitting module 308 retrieves 1208 the audio data from the audio data field 204, as well as the ordinal data 206 from the designated element. The splitting module 308 creates 1212 a new, second audio element and moves the audio data after the split point 802 from the designated audio element to the second audio element.

The splitting module 308 also creates new links or modifies 1214 existing links to other media objects for the second audio element that correspond to links for the portion of audio that is now stored in the second audio element. The splitting module 308 may also provide additional links such as to other audio elements. In one embodiment, the beginning point of an interval or range is used to determine which element an existing link object should be associated with. In another embodiment, if any link objects are associated with a point that fall within a range about the splitting point 802, the those link objects are duplicated with one set associated with the designated audio element 800 and the other set associated with the second audio object 806.

A number one greater than the ordinal value 434a of the designated audio element is determined and used as the ordinal value 434b for the second audio element. As shown in FIG. 8C, a new connecting line 808 may be created between the designated audio element 800 and the new second audio element 806 reflecting the relationship of their ordinal values. The splitting module 308 returns 1216 the new second audio element to the application module 316. The application module 316 stores the second audio element to the audio element storage 318 and the new or modified link objects to the link object storage 322. The application module 316 also reassigns the ordinal values of any other audio elements that have an ordinal value equal to or greater than that of the second audio element. Those remaining audio elements, whose ordinal values were higher than that of the second audio element will have their ordinal values increased by one so as to "make room" for the new second audio element. A heuristic is employed to determine the new screen location for the newly created audio element visual representation 806. One embodiment includes a heuristic that places the new audio element 806 with the higher ordinal value below the location of the original audio element visual representation 800 as shown in FIG. 8C. In embodiments in which the X-axis of the waveform is directly proportional to time, the waveform 408b in the visual representation 800 representing the designated element will appear similar to the waveform 408a in the original element preceding the split point and the waveform 408c in the second new element 806 will appear similar to the waveform 408a in the original element following the split point. This is the case can be seen from a comparison of the waveforms in FIGS. 8B and 8C.

In one embodiment of the splitting function, the audio element to be split contains audio data stored in a compressed format such as the MPEG layer 3 (mp3) or Real Audio (ra) formats. While some compressed audio formats can be split directly, many store audio in a context dependent fashion in which segments of audio data are useless in the absence of preceding segments. In this embodiment, the audio element and split point are designated, as they would be for uncompressed audio. The audio is first decompressed to a format in which the audio data is not context dependent. The uncompressed audio file is then split at the time location that was designated. The two new audio segments are each compressed, and the designated and the new audio elements each contain one of the newly compressed audio files. In the preferred embodiment, the decompression/compression process occurs invisibly and the splitting of compressed audio element appears no differently to the user than the splitting of uncompressed audio elements. Moreover and although not shown in FIG. 4A, those skilled in the art will recognize that the user interface may include a split tool or button. When selected, the split tool would put the system in a split mode of operation in which user selection or clicking on a waveform causes they system to split an audio element at the point on the waveform where the user clicked using the methods described above.

Reordering Audio Elements

Figure 15A:
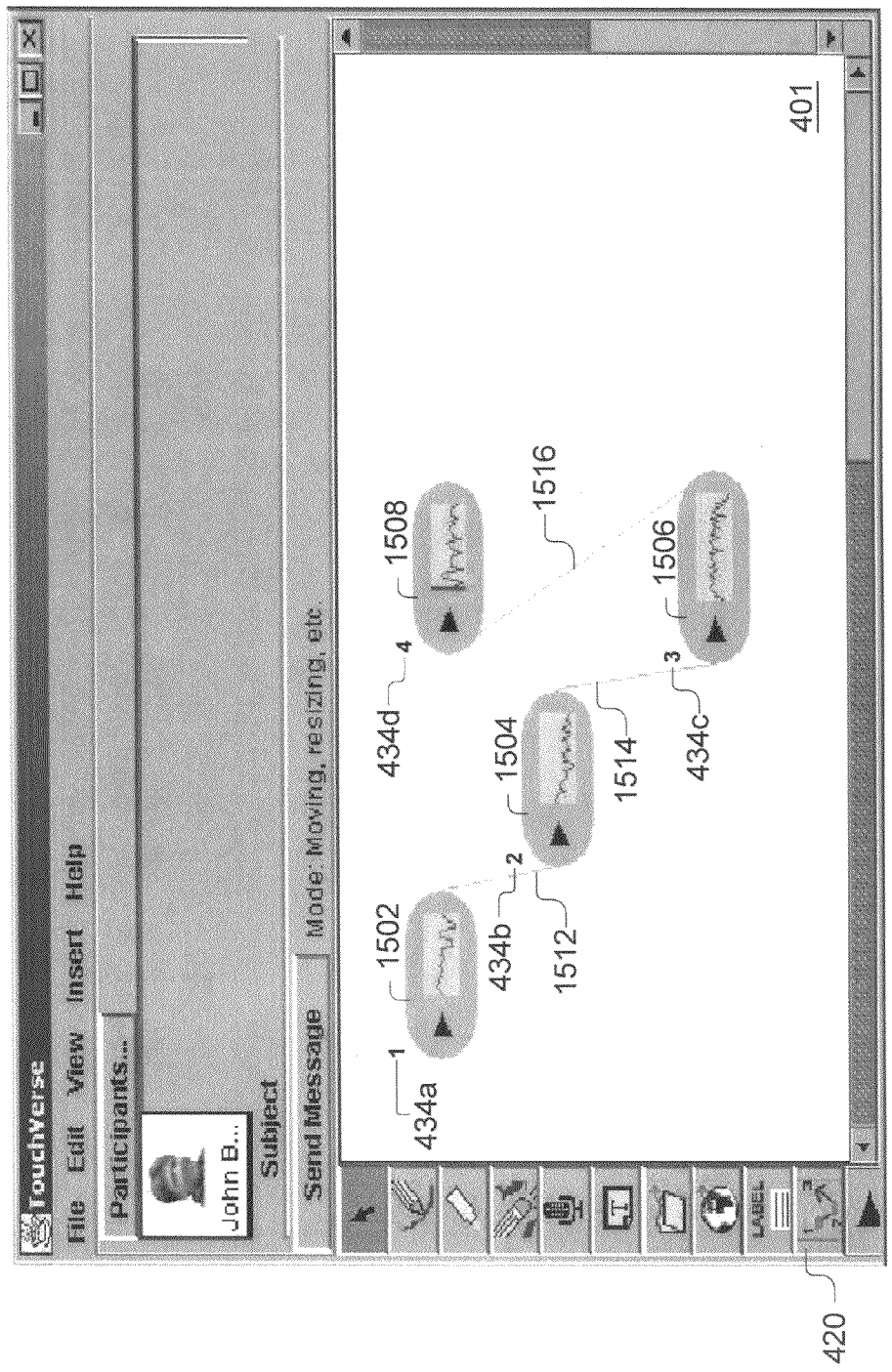
FIGS. 15A-15D illustrate visual representations of a preferred embodiment of the user interface at different times in the reordering process.
Figure 15B:
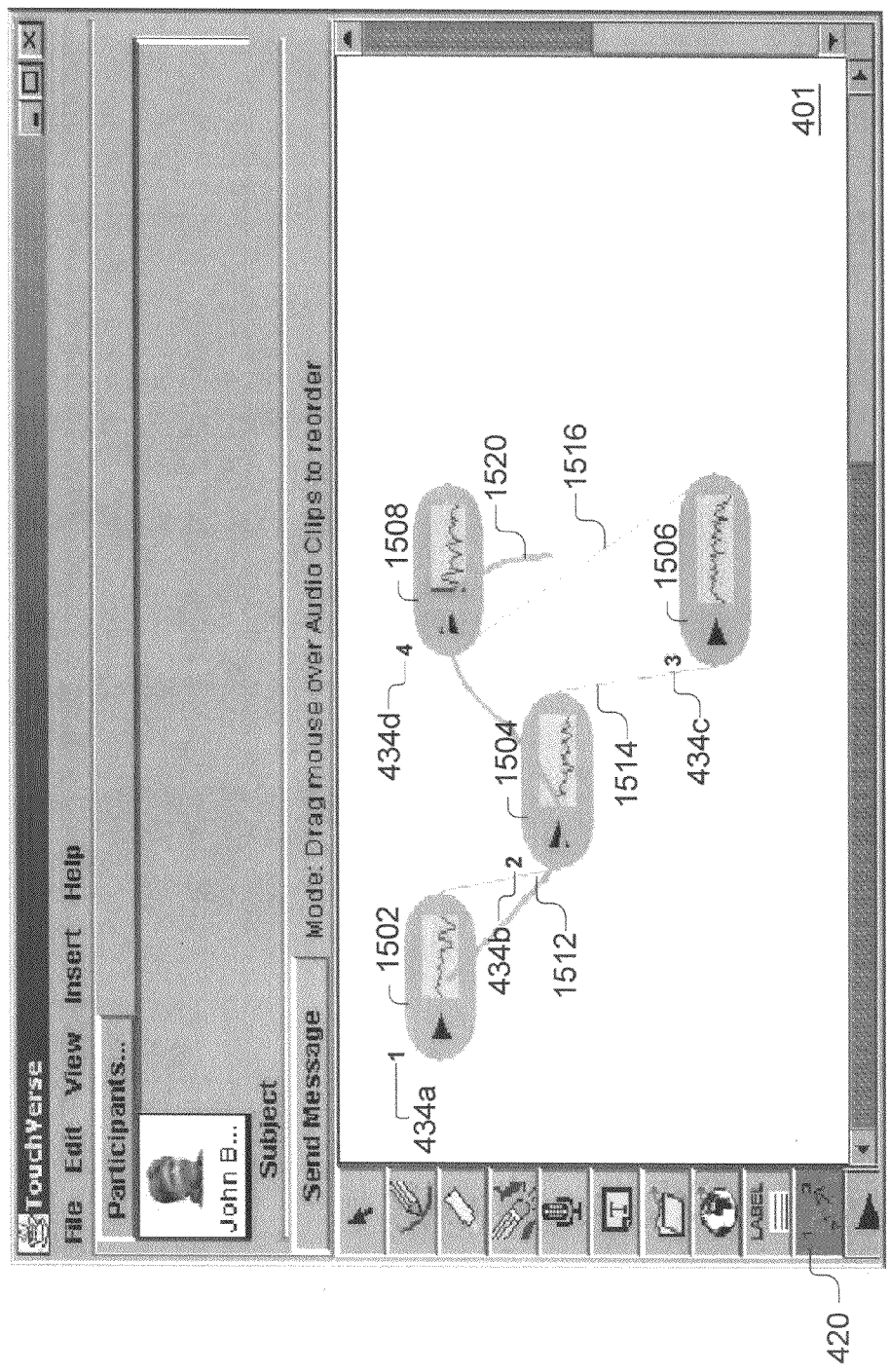
Figure 15C:
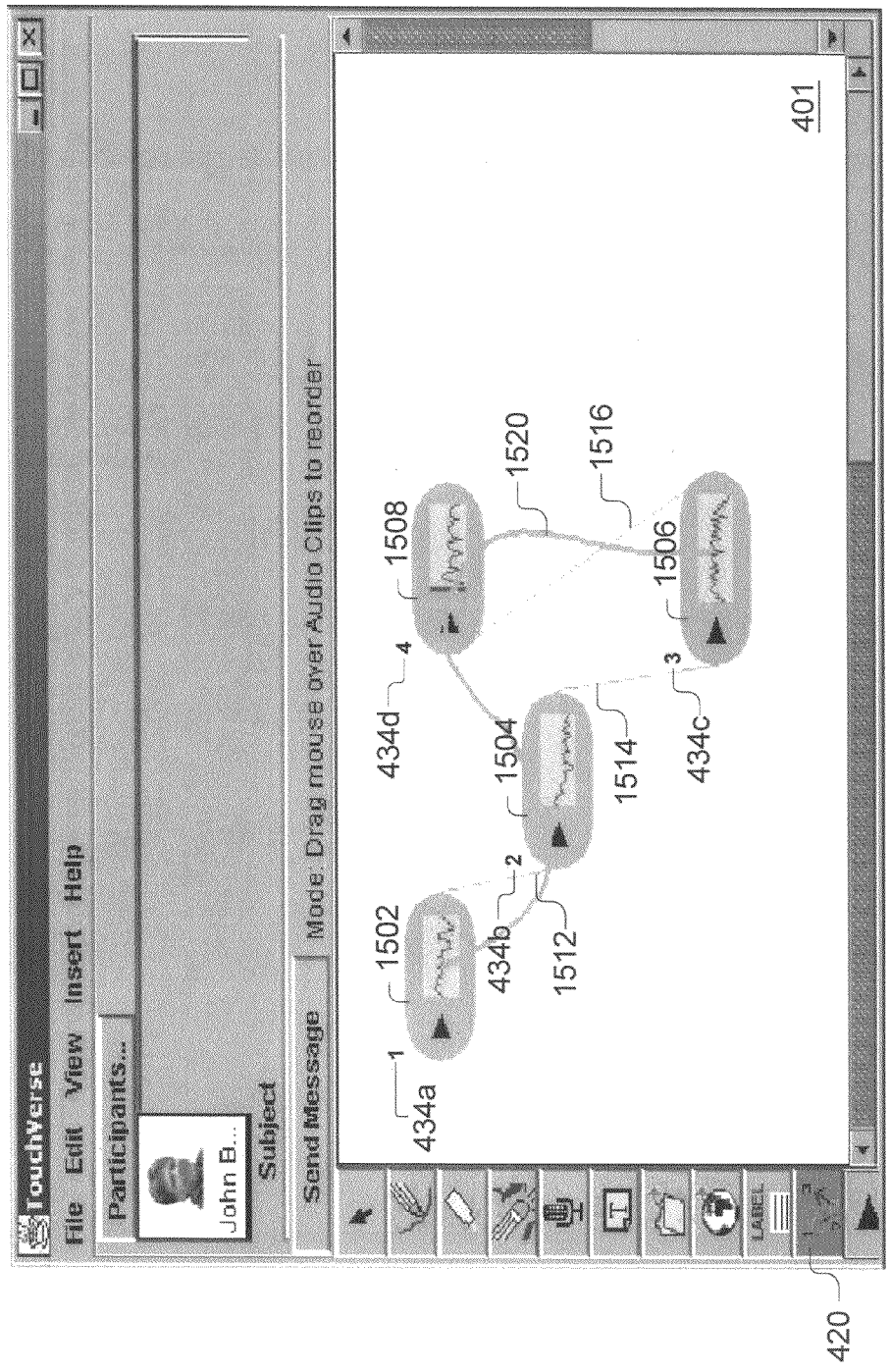

FIGS. 15A-15D illustrate a graphical representation of a preferred embodiment of the reordering process. Additionally, the process is described with respect to a flowchart shown in FIGS. 14A-14C. The reordering process begins by displaying 1400 a plurality of audio elements. As shown in FIG. 15A, a plurality of audio elements 1502, 1504, 1506 and 1508, having ordinal numbers 434a, 434b, 434c and 434d, and corresponding connecting lines 1512, 1514 and 1516 are shown in the interface 401. The reordering process is initiated by first engaging 1402 the positional stimulus point for the reordering process to set the system in reordering mode. Clicking on the reordering visual representation 420 using the pointing device 123 does this. Then a plurality of the audio elements 1502, 1504, 1506 and 1508, are selected 1404 for reordering and order is input. Referring now also to FIGS. 15B and 15C, this performed by using the pointing device 123 to trace across the audio elements 1502, 1504, 1506 and 1508 to be reordered in the order that is desired. The order is implicit in the order in which the audio elements 1502, 1504, 1506 and 1508 are traced over. The present invention provides feedback by displaying a trace line 1520 as the pointing device 123 crosses over the visual representations representing the audio elements 1502, 1504, 1506 and 1508. FIG. 15B show this input step partially complete. In FIG. 15B, the trace line 1520 has been drawn over the audio element 1502, the audio element 1504, and audio element 1508 in that order. In FIG. 15C, the tracing process is completed with the trace line 1520 being drawn over audio element 1506 before the release of the selection button in the case of a mouse, or remove of the user's pointing device from a touch screen. While FIGS. 15B and 15C illustrate all the shown audio elements being selected for reordering, a subset of those audio elements shown could also be selected for reordering.

Figure 15D:
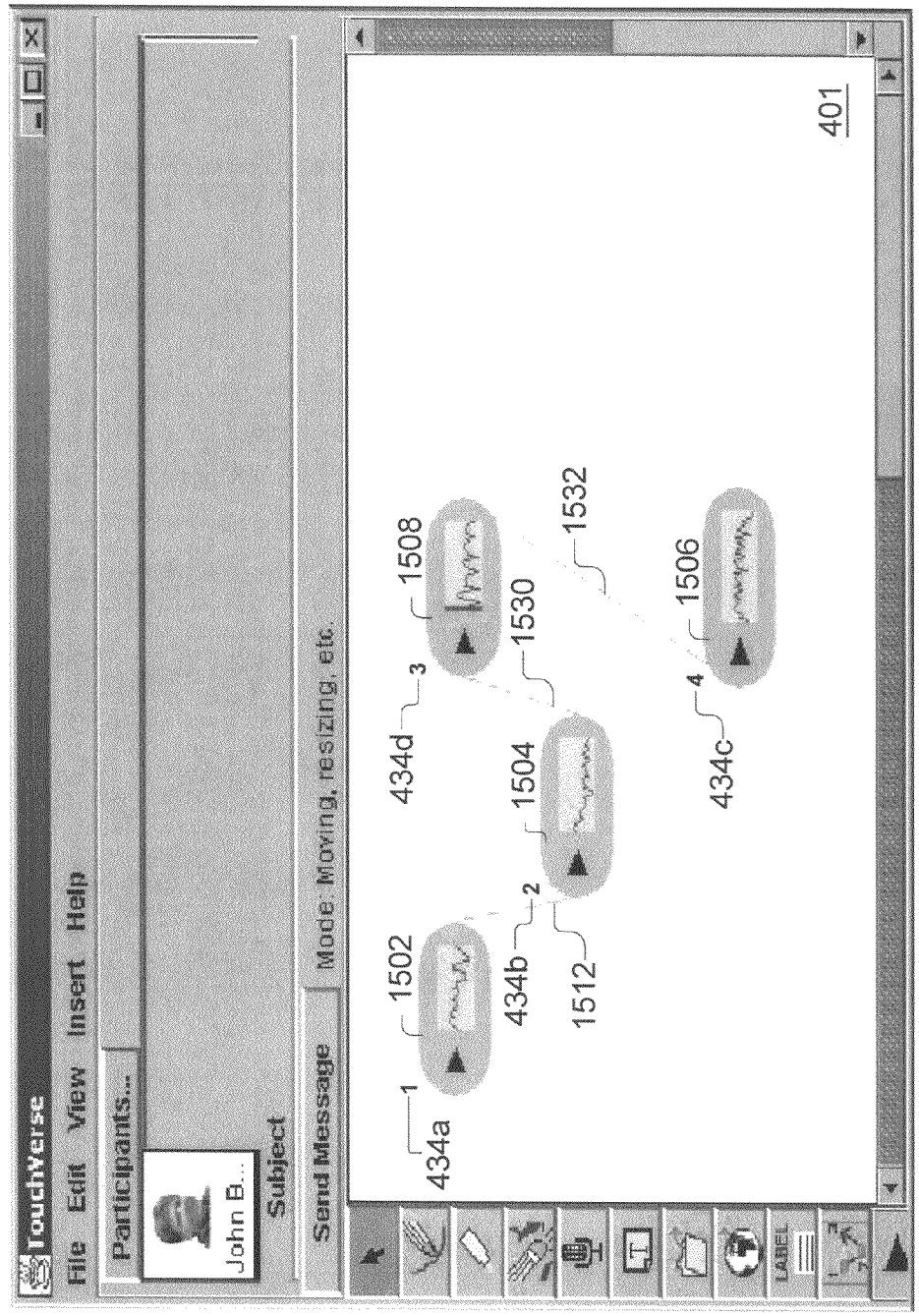

The application module 316 next retrieves 1406 the selected audio elements 1502, 1504, 1506 and 1508 from the audio element storage 318 and submits them to the reordering module 304. The reordering module 304 reads 1408 the ordinal value fields 206 of the selected audio elements 1502, 1504, 1506 and 1508. The reordering module 304 determines 1410 the lowest ordinal value of the selected audio elements 1502, 1504, 1506, and 1508. Using the lowest ordinal value determined and the input order, the reordering module 304 reorders 1412 the selected audio elements 1502, 1504, 1506, and 1508. For example, for the audio elements of FIG. 15C, the ordinal values of 1, 2, 3 and 4 are retrieved for audio elements 1502, 1504, 1506 and 1508, respectively. The input order based on trace order for the audio elements is 1502, 1504, 1508 and 1506. The reordering module 304 uses this information to generate the ordinal values of 1, 2, 3 and 4 for audio elements 1502, 1504, 1508 and 1506, respectively, as shown in FIG. 15D.

After reordering the selected elements, the method determines 1418 if there are any elements that were not selected for reordering. If not, the method reordering module 304 passes 1420 the reordered audio elements back to the application module 316 that updates 1422 the audio elements storage 318 in the memory 104. This also causes the display to be updated with new connecting lines 1530 and 1532 based on revised ordinal values as shown in FIG. 15D.

On the other hand, if there are elements that were not selected for reordering, the method transitions from step 1418 to step 1426. In step 1426, the reordering module 304 identifies any unselected audio elements. Then the reordering module 304 determines 1428 the ordinal value of each unselected audio element. The reordering module 304 reorders 1430 those unselected audio elements that have an ordinal value greater than the lowest ordinal value of the selected elements. The unselected audio elements are reordered beginning with an ordinal value of one greater that the highest ordinal value of the reordered, selected elements. It should be understood that the system displays connecting lines 808, 720, 1512, 1514, 1516, 1530 and 1532 between audio elements as screen representations of the ordinal ordering. In one embodiment, the user can input a selection that the lines not be displayed ("turned off") without affecting the ordinal positions which are also represented by the numbers 434a, 434b. Since those connecting lines are simply representations of the ordinal ordering, the system automatically updates them when they audio element are modified, and thus, explicit updating during reordering or other operations is not discussed. After step 1430, the method continues in step 1420. It should be understood that in an alternate embodiment, the unselected audio elements could just have their ordinal values set to null or no ordinal position. In such a case, the reordering of the selected audio elements would always begin with an ordinal value of 1.

While the present invention has been described above as reordering a plurality of audio elements, it is also applicable to reordering a single audio element or setting its ordinal value. For example, in the case where a plurality of elements exist, but you wanted to make a single audio element the first and only element with an ordinal number, this can be accomplished by selection of the reorder operation of the present invention and then just clicking on or drag over the one element. The selected element would have it ordinal value set to 1 and all the other elements would have their ordinal values set to null. Those skilled in the art will recognize that such reordering is within the scope of the present invention.

Linking Audio Elements to Other Content

Figure 16A:
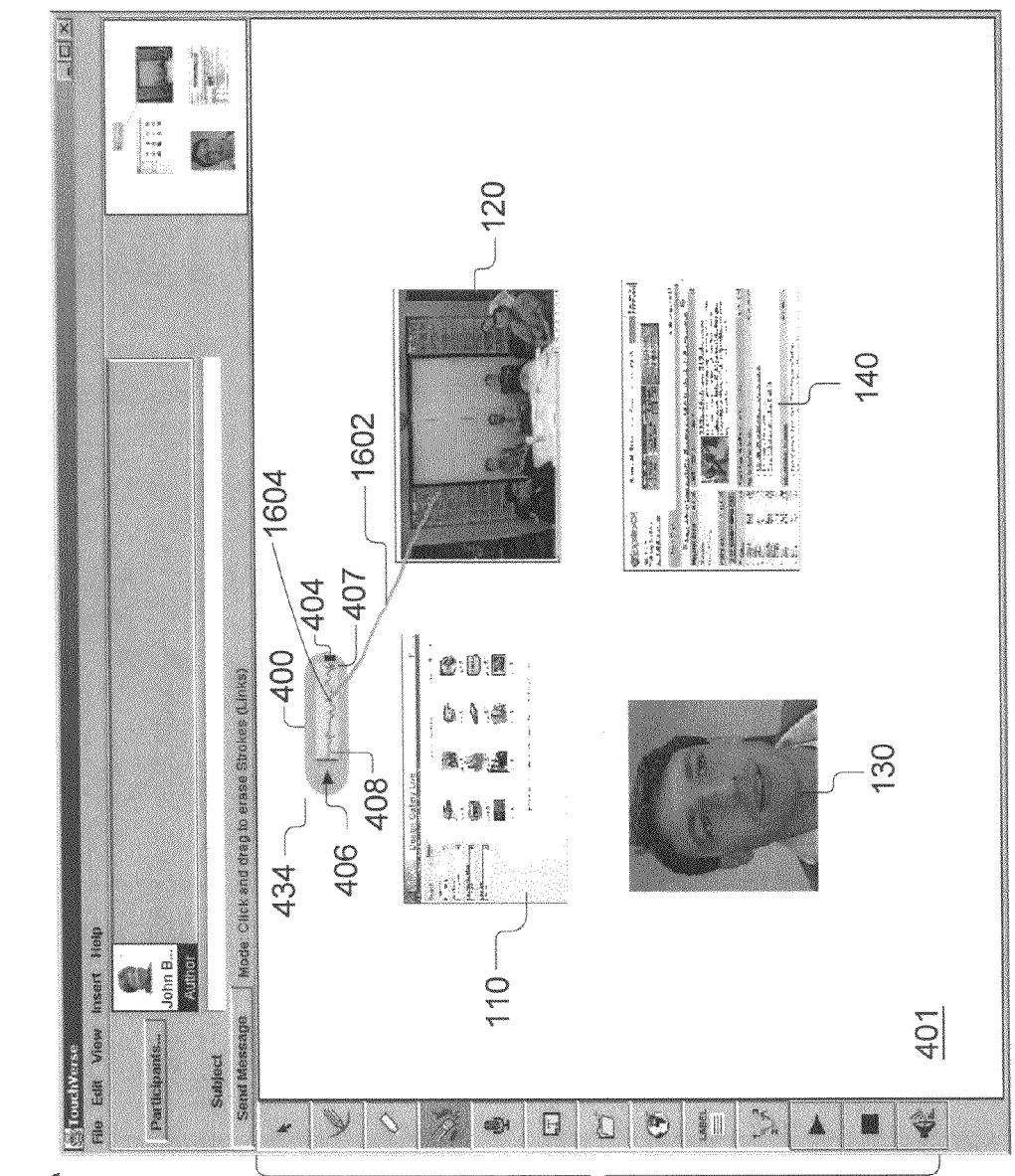
FIGS. 16A-16B illustrate visual representations of a preferred embodiment of the user interface at different times in the linking process.
Figure 16B:
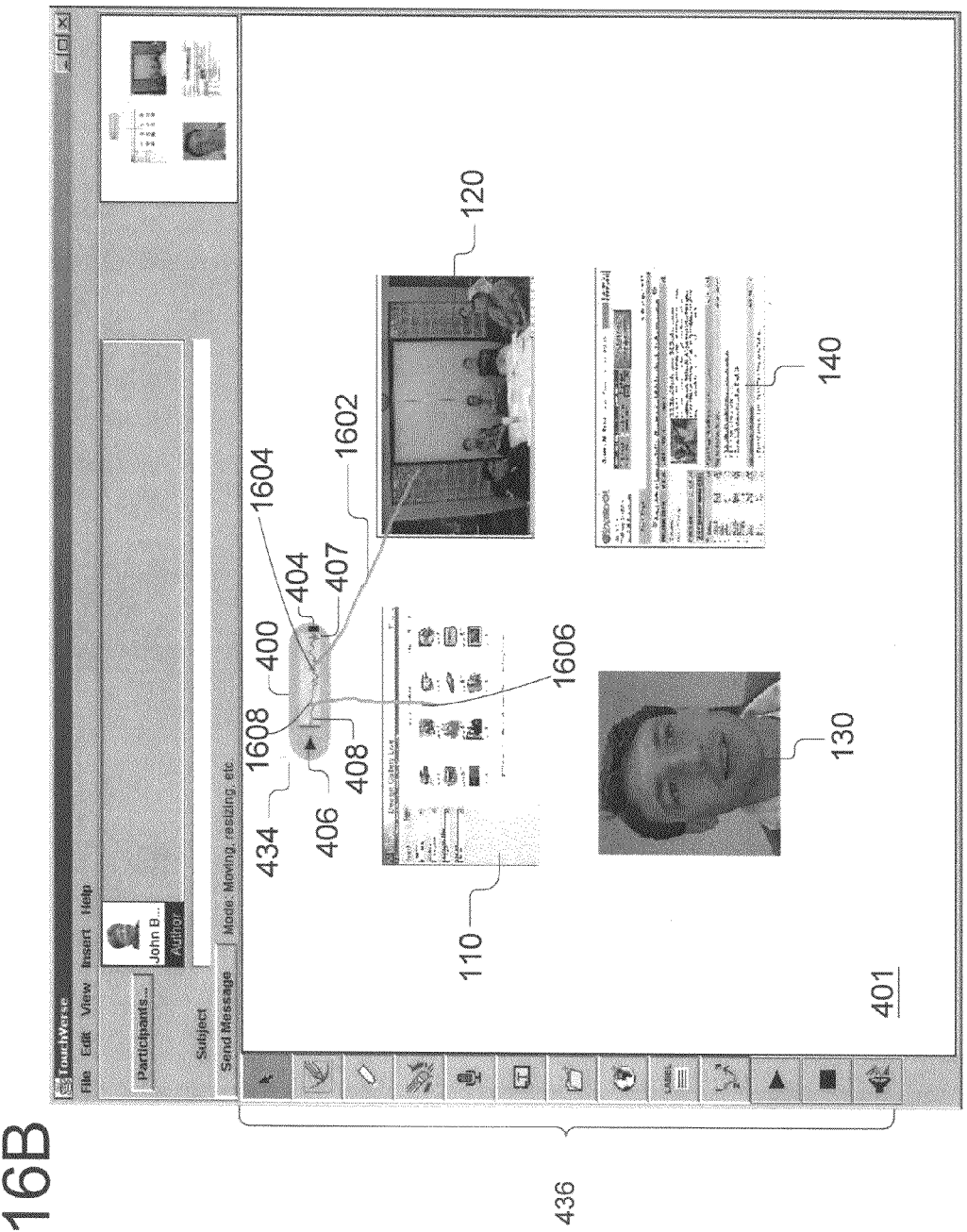

FIGS. 16A-16B illustrate a graphical representation of a preferred embodiment of the linking process. Additionally, the linking process is described with reference to the flowchart of FIG. 13. The linking function allows for linking of a designated temporal range in an audio stream with other media objects, such as graphical content or an HTML document. The linking process is initiated when the positional stimulus point corresponding to linking is then engaged 1300. For example, selection of the drawing visual representation 424 sets the system into a mode where the drawing of a line between objects by the user is interpreted by the system as a command to create a link between ranges in the respective objects. While the present invention will now be described in the context of linking a temporal range of an audio element to a range in a media object, those skilled in the art will recognize that the present invention applies to creating links between any two elements or objects such as between two audio elements or between an audio element and another type of media object.

Once the linking mode has been set, the user identifies an audio element to be linked and a desired range in the audio element by performing a selection operation 1302 on a representation or thumbnail of a media object to be linked and clicking on a range in the representation of the media object. For example, the selection operator is applied 1302 to a waveform range 1604 in an audio element visual representation 400 corresponding to a designated temporal range in a designated audio element. An visual representation 120 representing a designated media object and a range in the designated media object is then selected using the selection operator. To provide all the linking information, the user need only draw a line from a point in the waveform 408 of the audio element 400 to a point in the representation of the media object 120. The application module 316 then reads 1304 the designated element and the media object from memory 104. The audio element 400 is retrieve from the audio element storage and the 318 and the media object is read from the media object storage 320. The application module 316 submits 1306 the audio element, the designated temporal range in the audio element, the media object, and a range in the media object to the linking module 312. The linking module 312 then creates a new link object as has been discussed above with reference to FIG. 2B. The linking module 312 embeds 1308 an identifier for the audio element in field 252, a temporal range in the interval field 254, an identifier for the media object in field 256, and a range in the interval field 258 of the linking object. The linking module 312 passes 1310 the link object to the application module 316, and the application module 316 stores the link object in link storage 322. The display is updated 1314 to show a line or connector 1602 between the visual representations representing the audio element 400 and the media object 120. Referring now to FIG. 16B, another link 1606 having a corresponding range 1608 to the same audio element 400 is shown. Thus, an audio element may have any number of links. Furthermore, an audio element may be linked in the same way to other audio elements as shown in FIG. 15A and discussed for reordering above. It should be understood that an audio element may even be linked to itself by linking two ranges of the same waveform. By way of example, employing the procedures listed above, an audio recording could be created wherein a news event is discussed during a temporal range comprising t=30 seconds to t=60 seconds. That temporal range could be linked to an HTML document discussing the news event. When viewed, sections of waveform 1608 representing segments of audio elements that have been linked to representations of media objects may be represented in different colors. One embodiment of the linking process would display the media object when the sections of the waveform representing the linked media object are touched or clicked.

One embodiment of the linking process would allow for the media object to be displayed when the designated temporal range is played. The system defines media objects or elements as including pictures, videos, web pages, etc. The present invention has discussed displaying a representation of a media object as showing a thumbnail image of the media object, however, those skilled in the art will recognize that displaying a media object also includes displaying a picture in a separate window at full resolution, playing a video or opening a browser to show a web page. After the linking steps above are performed, an auto-play positional stimulus point could be engaged. When enabled this feature would cause associated content to load when the designated portion of the audio element is reached during playback. One purpose of linking an audio object to a media object is to indicate a relationship. For example, the user may want to clarify the pronunciation of a person's name in a digital photograph. If the photograph is displayed in the application window 401 as a media object representation 130, the user can speak the name of that person and link the audio to the photograph. The range of the link can reflect the portion of the audio element containing the spoken name. For instance, if the name is spoken 20 seconds after the beginning of the recording and the spoken name lasts for 2 seconds of the audio element, the range can reflect the portion of the audio from 20 seconds to 22 seconds. In some instances, it might be desirable to have the photograph shown in full resolution, perhaps in a different window than the application window. It is possible to cause a window to open displaying the full media object automatically at the time the appropriate range of audio is being played. For example, 20 seconds after pressing the play button on the audio element, a window opens displaying the full resolution photograph. At 22 seconds, the window can be closed, or it can remain open until the user decides to shut it.

Therefore, it should be understood that the term displayed is defined liberally to include these activities and similar for interfacing with the user.

In yet another embodiment, the linking operations may be integrated with the audio recording or playback methods described above. During the actual recording of audio by the system, the user simultaneously selects a media object. In response to such input, the system determines a temporal range of the audio element corresponding to the time when the user selected the media object. A link is automatically created between the media object and the range. More particularly, the link may set a range in the media object based upon the point at which the user selected the media object in cases where the display and input device provide a level of granularity that provides meaningful distinctions of position that would correspond to ranges in the media object.

While the present invention has been described with reference to certain preferred embodiments, those skilled in the art will recognize that various modifications may be provided. For example, there may be a variety of other mechanism that may be included as part of the user interface to enable the functionality that has been described above. Variations upon and modifications to the preferred embodiments are provided for by the present invention, which is limited only by the following claims.

What is claimed is:

1. A method for deleting audio elements, each audio element having a graphical component, the method comprising the steps of:
   receiving user input;
   responsive to the user input, identifying first audio element to be deleted;
   determining a visual representation including an audio indicator and an audio gauge corresponding to the first audio element;
   removing the visual representation of the first audio element from a display;
   deleting the first audio element from memory;
   determining a second audio element that has an ordinal value greater than the first audio element;
   retrieving and decrementing the ordinal value of the second element determined to have an ordinal value greater than the first audio element;
   modifying a link object including at least one of a reference to the first audio element and a reference to the second audio element; and
   removing, from the display, a visual representation of a link as a connector between the visual representation of the first audio element and a visual representation of the second audio element, wherein a spatial location of the visual representation of the second audio element is independent of a temporal sequence or relationship to the first audio element and the visual representation of the first audio element.

2. A method for reordering two or more audio elements, each audio element having a graphical component, the method comprising the steps of:
   receiving user input;
   identifying a chosen set of audio elements to be reordered from the user input;
   identifying a new order for the chosen set of audio elements based on the user input such that the chosen set of audio elements are ordered spatially independent of each other;
   determining a lowest ordinal value for the chosen set of audio elements;
   modifying an ordinal value of each of the audio elements in the chosen set of audio elements using the new order;
   modifying a link object including a reference to at least a first audio element of the chosen set having a modified ordinal value; and
   updating a user interface of the chosen set of audio elements to reflect the modified ordinal values, the display including a visual representation of a link as a connector between a visual representation of the first audio element and a visual representation of a second audio element, wherein a spatial location of the visual representation of the second audio element is independent of a temporal sequence or relationship to the first audio element and the visual representation of the first audio element.

3. The method of claim 2, further comprising the step of storing the modified ordinal values for the chosen set of audio elements.

4. The method of claim 2, wherein the step of determining the lowest ordinal value for the chosen set of audio elements further comprises the steps of:
   retrieving each audio element in the chosen set;
   retrieving an ordinal value for each audio element in the chosen set; and
   comparing the retrieved ordinal values to determine the lowest ordinal value.

5. The method of claim 2, wherein the user input includes selecting a reordering mode and moving a cursor over visual representations corresponding to audio elements using a pointing device, and wherein the chosen set is determined by the visual representations over which the cursor crosses, and the new order is an order in which the visual representations are crossed.

6. The method of claim 5, wherein the method further comprises a step of displaying a feedback as to which visual representations the cursor has been moved across and the order in which the cursor was moved across them.

7. The method of claim 2, further comprising the steps of:
   determining whether there are any audio elements not chosen for reordering;
   if there are audio elements not chosen for reordering, identifying any unselected audio elements;
   determining an ordinal value of each unselected audio element;
   modifying the ordinal values of each of the unselected audio elements that have an ordinal value greater than the lowest ordinal value; and
   updating the display of the unselected audio elements to reflect the modified ordinal values.

8. A method of associating an audio element with a media object, the method comprising the steps of:
   receiving user input identifying the media object and the audio element to be associated;
   creating a link object;
   storing a reference to the media object and the audio element in the link object; and
   displaying a visual representation of the link object as a connector between the visual representations of the media object and the audio element, wherein spatial locations of the visual representations of the media object and the audio element are independent of each other and a temporal sequence or relationship and are controllable by a user.

9. The method of claim 8, further comprising the steps of:
   receiving user input identifying a range in the audio element; and
   storing the range in the link object.

10. The method of claim 9, wherein the step of displaying further comprises:
displaying the visual representation of the audio element;
displaying the visual representation of the media object; and
displaying the connector between the visual representation of the audio element at the range and the visual representation of the media object.

11. The method of claim 8 further comprising the steps of:
receiving user input identifying a range in the media object; and
storing the range in the link object.

12. The method of claim 11 wherein the step of displaying further comprises:
displaying the visual representation of the audio element;
displaying the visual representation of the media object; and
displaying the connector between the visual representation of the audio element and the range in the visual representation of the media object.

13. A method of outputting audio signals, the method comprising the steps of:
displaying a visual representation of at least a first audio element, a visual representation of a second audio element and a visual representation of a link as a connector between the visual representation of the first audio element and the visual representation of the second audio element located spatially on a two-dimensional layout capable of displaying non-audio elements, the visual representation of the first audio element including an audio indicator;
receiving user input;
identifying the first audio element, with an audio data field, based on the user input;
retrieving first audio data for the first audio element from the audio data field;
outputting the first audio data; and
highlighting sections of the audio indicator corresponding to a temporal range for which audio output has been provided,
wherein a spatial location of the visual representation of the first audio element is independent of the audio data field of the first audio element, a temporal sequence or relationship to the second audio element and the visual representation of the second audio element and is controllable by the user.

14. The method of claim 13, wherein the audio indicator is at least one of a waveform, a length of the waveform relating to a time measurement of the audio data and a height of the waveform relating to at least one of a measurement of energy and a pitch in the audio data.

15. The method of claim 13, wherein the audio indicator is a color graph, each color in the graph relating to at least one of a measurement of energy and a pitch in the audio data.

16. The method of claim 13, wherein the highlighting is shading.

17. The method of claim 13, wherein the audio indicator is a waveform and highlighting is rendering the waveform in bold.

18. The method of claim 13, wherein the audio indicator is a waveform and the highlighting is rendering the waveform in a different color from the visual representation of the first audio element.

19. The method of claim 13, wherein the step of displaying includes displaying a plurality of audio elements, and wherein the method further comprises the steps of:
determining an ordinal number for the first audio element;
determining whether there are any audio elements with an ordinal number greater than the ordinal number for the first audio element;
identifying the second audio element as having an ordinal number greater than the ordinal number for the first audio element;
retrieving second audio data for the second audio element;
outputting the second audio data for the second audio element; and
highlighting sections of a waveform corresponding to a temporal range of the second audio data for which audio output has been provided.

20. The method of claim 19, wherein the steps of retrieving the second audio data and outputting the second audio data are performed after the first audio data has been output.

21. The method of claim 13, further comprising the steps of:
receiving a stop signal from the user; and
terminating the outputting of the first audio data.

22. The method of claim 13, further comprising the steps of:
receiving a create new audio element signal from a user; and
terminating the outputting of the first audio data.

23. A method of joining audio elements comprising:
receiving user input identifying a first and second audio elements to be joined;
creating a new audio element;
retrieving information from the first audio element and storing it in the new audio element;
retrieving information from the second audio element and storing it in the new audio element;
deleting the first and second audio elements;
modifying a link object including a reference to at least one of the deleted first and second audio elements to delete said reference and to include a reference to the new audio element; and
updating a user interface to reflect the modified link object, the updated display including a visual representation of a link as a connector between a visual representation of the new audio element and a visual representation of a third audio element, wherein a spatial location the visual representation of the third audio element is independent of a temporal sequence or relationship to the new audio element and the visual representation of the new audio element.

24. The method of claim 23, wherein the information from the first audio element includes an ordinal value.

25. The method of claim 24, further comprising the step of determining the ordinal value of the first audio element and using the determined ordinal value as the ordinal value for the new audio element.

26. The method of claim 24, further comprising the step of reducing by one the ordinal value of any audio elements having ordinal values higher than that of the first audio element.

27. The method of claim 23, further comprising the step of modifying a link object which is associated with the second audio element to be associated with the new audio element.

28. The method of claim 27, wherein the step of modifying the link object includes modifying a reference to point to the new audio element and adjusting range information.

29. A method of joining audio elements comprising:
receiving user input identifying a first and second audio elements to be joined;
retrieving information from the second audio element;

storing the retrieved information from the second audio element in the first audio element;
deleting the second audio element;
modifying a link object including a reference to the deleted second audio element to include a reference to the first audio element; and
updating a user interface to reflect the modified link object, the updated display including a visual representation of a link as a connector between a visual representation of the first audio element and a visual representation of a third audio element, wherein a spatial location of the visual representation of the third audio element is independent of a temporal sequence or relationship to the first audio element and the visual representation of the first audio element.

30. The method of claim 29, wherein the information from the second audio element includes an audio data signal.

31. The method of claim 29, further comprising the step of reducing by one the ordinal value of any audio elements having ordinal values higher than that of the first audio element.

32. The method of claim 29, further comprising the step of modifying a link object that is associated with the second audio element to be associated with the first audio element.

33. The method of claim 32, wherein the step of modifying the link object includes modifying a reference to point to the first audio element and adjusting range information.

34. A method of splitting an audio element, the method comprising the steps of:
receiving user input identifying an original audio element to be split, the original audio element containing a beginning point, an ending point and a splitting point, the splitting point situated in between the beginning point and the ending point;
creating a first audio element;
creating a second audio element;
retrieving first audio data from the original audio element, the first audio data retrieved between the beginning point and the splitting point;
retrieving second audio data from the original audio element, the second audio data retrieved between the splitting point and the ending point;
storing first audio data in the first audio element;
storing second audio data in the second audio element;
deleting the original audio element;
modifying a link object including a reference to the original audio element to delete said reference and to include a reference to the first and second audio elements; and
updating a user interface to reflect the modified link object, the updated display including a visual representation of a link as a connector between a visual representation of the first audio element and a visual representation of a third audio element, wherein a spatial location the visual representation of the third audio element is independent of a temporal sequence or relationship to the first audio element and the visual representation of the first audio element.

35. The method of claim 34, further comprising the steps of determining link to audio data from the splitting point in the original audio element to the ending point;
updating the link object to refer to the second audio element; and
updating a user interface of the visual representations of the first audio element, the second audio element and the link to reflect the new association.

36. A method of splitting an audio element, the method comprising the steps of:
receiving user input identifying a first audio element to be split, the first audio element containing a beginning point, an ending point and a splitting point situated in between the beginning point and the ending point;
creating a second audio element;
retrieving audio data from the first element, the audio data retrieved between the splitting point and the ending point of the first audio element;
storing the retrieved audio data in the second audio element;
deleting retrieved audio data from the first audio element;
modifying a link object including a reference to the first audio element to include a reference to the second audio element; and
updating a user interface to reflect the modified link object, the updated display including a visual representation of a link as a connector between a visual representation of the second audio element and a visual representation of a third audio element, wherein a spatial location of the visual representation of the third audio element is independent of a temporal sequence or relationship to the second audio element and the visual representation of the second audio element.

37. The method of claim 36, further comprising a step of displaying visual representations of the first audio element and the second audio element located spatially on a two dimensional layout.

38. The method of claim 36, further comprising the steps of:
determining an ordinal value for the first audio element;
storing a value of the determined ordinal value plus one as the ordinal value for the second audio element; and
updating a user interface of the visual representations of the first and second audio elements to reflect the stored ordinal values.

39. The method of claim 38, further comprising the steps of:
determining any audio elements having an ordinal value greater than the ordinal value for the first audio element; and
increasing by one the ordinal values of those determined elements having ordinal values higher than that of the first audio element.

40. The method of claim 36, further comprising the steps of:
determining link to audio data from the splitting point in the first audio element to the ending point;
updating the link object to refer to the second audio element; and
updating the display of the visual representations of the first audio element, the second audio element and the link to reflect the new association.

41. A method for displaying media objects in conjunction with outputting audio data, the method comprising the steps of:
identifying an audio element;
retrieving audio data for the identified audio element from an audio data field;
outputting the retrieved audio data;
retrieving a link object referring to the identified audio element;
retrieving a media object referred to from the link object; and
displaying a visual representation of the media object, a visual representation of the audio element, a visual representation of a link as a connector between the visual representation of the audio element and the visual representation of the media object, wherein a spatial location of the visual representation of the media object is independent of a temporal sequence or a relationship to the audio element and the visual representation of the audio element and controllable by a user.

42. The method of claim 41, wherein the link object identifies an audio range in the audio data field of the audio element to which it refers, and wherein the step of displaying is performed when an audio range specified in the link object is reached.

43. The method of claim 41, wherein the link object identifies a range in the media object to which it refers, and wherein the step of displaying, displays the range in the media object.

44. The method of claim 41, wherein the link object identifies a range in the media object to which it refers, and wherein the step of displaying, displays the range in a separate window.

* * * * *